US009129145B2

(12) United States Patent
Abiko

(10) Patent No.: US 9,129,145 B2
(45) Date of Patent: Sep. 8, 2015

(54) IDENTIFICATION APPARATUS, IDENTIFICATION METHOD, AND PROGRAM

(75) Inventor: Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 374 days.

(21) Appl. No.: 13/610,224

(22) Filed: Sep. 11, 2012

(65) Prior Publication Data

US 2013/0004032 A1 Jan. 3, 2013

Related U.S. Application Data

(63) Continuation of application No. PCT/JP2010/054851, filed on Mar. 19, 2010.

(51) Int. Cl.
*G06K 9/00* (2006.01)
(52) U.S. Cl.
CPC .................................. *G06K 9/00087* (2013.01)
(58) Field of Classification Search
CPC .................................................. G06K 9/00087
USPC .................. 382/115, 124; 356/71; 283/68–70
See application file for complete search history.

(56) References Cited

U.S. PATENT DOCUMENTS

| 5,040,223 | A | * | 8/1991 | Kamiya et al. | ................. | 382/127 |
| 5,337,369 | A | | 8/1994 | Shibuya | | |
| 5,465,303 | A | * | 11/1995 | Levison et al. | ................ | 382/124 |
| 5,901,239 | A | * | 5/1999 | Kamei | .......................... | 382/125 |
| 5,974,163 | A | | 10/1999 | Kamei | | |
| 6,047,079 | A | | 4/2000 | Uchida | | |
| 6,091,839 | A | * | 7/2000 | Uchida | ......................... | 382/125 |
| 7,155,039 | B1 | * | 12/2006 | Lo | ................................. | 382/124 |
| 8,867,797 | B2 | * | 10/2014 | Benini | ......................... | 382/115 |
| 2001/0040988 | A1 | | 11/2001 | Takahashi | | |
| 2002/0048390 | A1 | | 4/2002 | Ikegami | | |

(Continued)

FOREIGN PATENT DOCUMENTS

| JP | 4-52974 | 2/1992 |
| JP | 6-139338 | 5/1994 |
| JP | 9-161054 | 6/1997 |

(Continued)

OTHER PUBLICATIONS

English Translation of the International Preliminary Report on Patentability issued Nov. 1, 2012 in corresponding International Patent Application No. PCT/JP2010/054851.

(Continued)

*Primary Examiner* — Samir Ahmed
(74) *Attorney, Agent, or Firm* — Staas & Halsey LLP

(57) ABSTRACT

An identification apparatus includes a classification unit that determines two or more classes into which input biometric data is classified out of a plurality of classes based on features of the input biometric data, where a plurality of items of registered biometric data have been classified into at least one of the plurality of classes, a calculation unit that calculates similarity between the input biometric data and each item of the registered biometric data registered in each of the two or more classes into which the input biometric data is classified, and an identification unit that identifies data on a user who has entered the input biometric data among the registered biometric data registered in any of the two or more classes into which the input biometric data is classified, based on the similarity to the input biometric data.

7 Claims, 33 Drawing Sheets

(56) References Cited

U.S. PATENT DOCUMENTS

2004/0013287 A1* 1/2004 Takeuchi et al. .............. 382/124
2006/0018523 A1 1/2006 Saitoh et al.

FOREIGN PATENT DOCUMENTS

| JP | 10-124668 | 5/1998 |
|---|---|---|
| JP | 10-187970 | 7/1998 |
| JP | 2001-21309 | 1/2001 |
| JP | 2001-167268 | 6/2001 |
| JP | 2002-133416 | 5/2002 |
| JP | 2003-256815 | 9/2003 |
| JP | 2006-39777 | 2/2006 |
| JP | 2006-72429 | 3/2006 |

OTHER PUBLICATIONS

Notice of Reason for Rejection, dated Mar. 25, 2014, in corresponding Japanese Application No. 2012-505417 (4 pp.).
International Search Report of PCT/JP2010/054851 mailed May 11, 2010.

* cited by examiner

WHORL TYPE

RIGHT LOOP TYPE

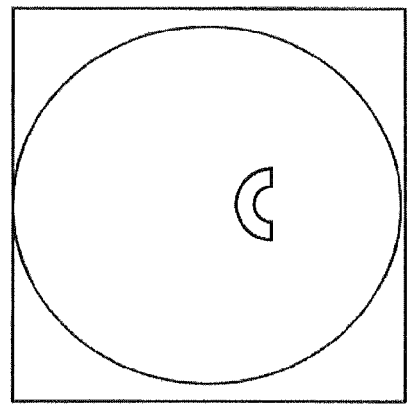
FIG.12D  ARCH TYPE

TENTED ARCH TYPE

FIG.13

| CLASS | CONVEX UPWARD CORE | CONVEX DOWNWARD CORE | DELTA | POSITIONAL RELATIONSHIP BETWEEN DELTA AND CENTER AXIS |
|---|---|---|---|---|
| WHORL TYPE | 1 | 1 | 2 | BETWEEN DELTAS |
| RIGHT LOOP TYPE | 1 | 0 | 1 | DELTA ON LEFT SIDE OF CENTER AXIS |
| LEFT LOOP TYPE | 1 | 0 | 1 | DELTA ON RIGHT SIDE OF CENTER AXIS |
| ARCH TYPE | 1 | 0 | 0 | NONE |
| TENTED ARCH TYPE | 1 | 0 | 1 | DELTA SUBSTANTIALLY ON CENTER AXIS |

FIG.15A

| NUMBER OF SINGULAR POINTS | CONVEX UPWARD CORE | CONVEX DOWNWARD CORE | DELTA | CONDITION | CLASS | RELI-ABILITY |
|---|---|---|---|---|---|---|
| 4 | 1 | 1 | 2 | — | WHORL | 100 |
| 3 | 1 | 1 | 1 | — | WHORL | 100 |
| 3 | 1 | 0 | 2 | — | WHORL | 100 |
| 3 | 0 | 1 | 2 | — | WHORL | 100 |
| 2 | 1 | 1 | 0 | — | WHORL | 100 |
| 2 | 1 | 0 | 1 (LEFT) | SUFFICIENTLY LARGE AREA ON LEFT SIDE OF CENTER AXIS | RIGHT LOOP | 100 |
| | | | | SMALL AREA ON LEFT SIDE OF CENTER AXIS | WHORL | 60 |
| | | | | | RIGHT LOOP | 40 |
| 2 | 1 | 0 | 1 (RIGHT) | SUFFICIENTLY LARGE AREA ON RIGHT SIDE OF CENTER AXIS | LEFT LOOP | 100 |
| | | | | SMALL AREA ON RIGHT SIDE OF CENTER AXIS | WHORL | 60 |
| | | | | | LEFT LOOP | 40 |

FIG.15B

| NUMBER OF SINGULAR POINTS | CONVEX UPWARD CORE | CONVEX DOWNWARD CORE | DELTA | CONDITION | CLASS | RELI-ABILITY |
|---|---|---|---|---|---|---|
| 2 | 1 | 1 | 0 | — | WHORL | 100 |
| 2 | 0 | 0 | 2 | — | WHORL | 100 |
| 1 | 1 | 0 | 0 | SUFFICIENTLY LARGE AREA BELOW CONVEX UPWARD CORE | ARCH | 100 |
| | | | | SMALL AREA BELOW CONVEX UPWARD CORE | WHORL | 30 |
| | | | | | LEFT LOOP | 20 |
| | | | | | RIGHT LOOP | 20 |
| | | | | | TENTED ARCH | 15 |
| | | | | | ARCH | 15 |
| 1 | 0 | 1 | 0 | — | WHORL | 100 |
| 1 | 0 | 0 | 1 | SUFFICIENTLY LARGE AREA ABOVE DELTA | WHORL | 40 |
| | | | | | LEFT LOOP | 30 |
| | | | | | RIGHT LOOP | 30 |
| | | | | SMALL AREA ABOVE DELTA | WHORL | 35 |
| | | | | | LEFT LOOP | 25 |
| | | | | | RIGHT LOOP | 25 |
| | | | | | TENTED ARCH | 15 |
| 0 | 0 | 0 | 0 | — | NONE | 0 |

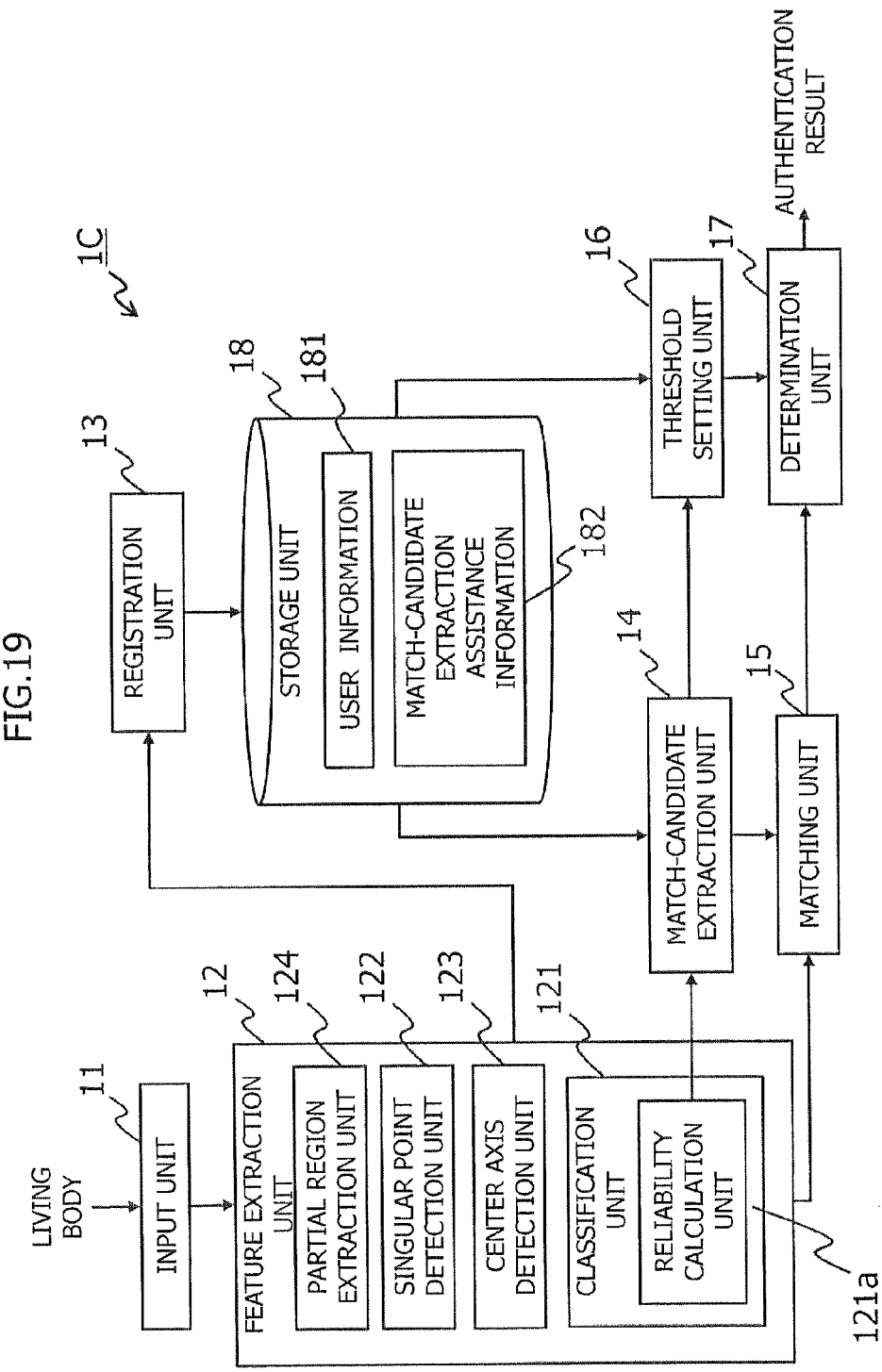

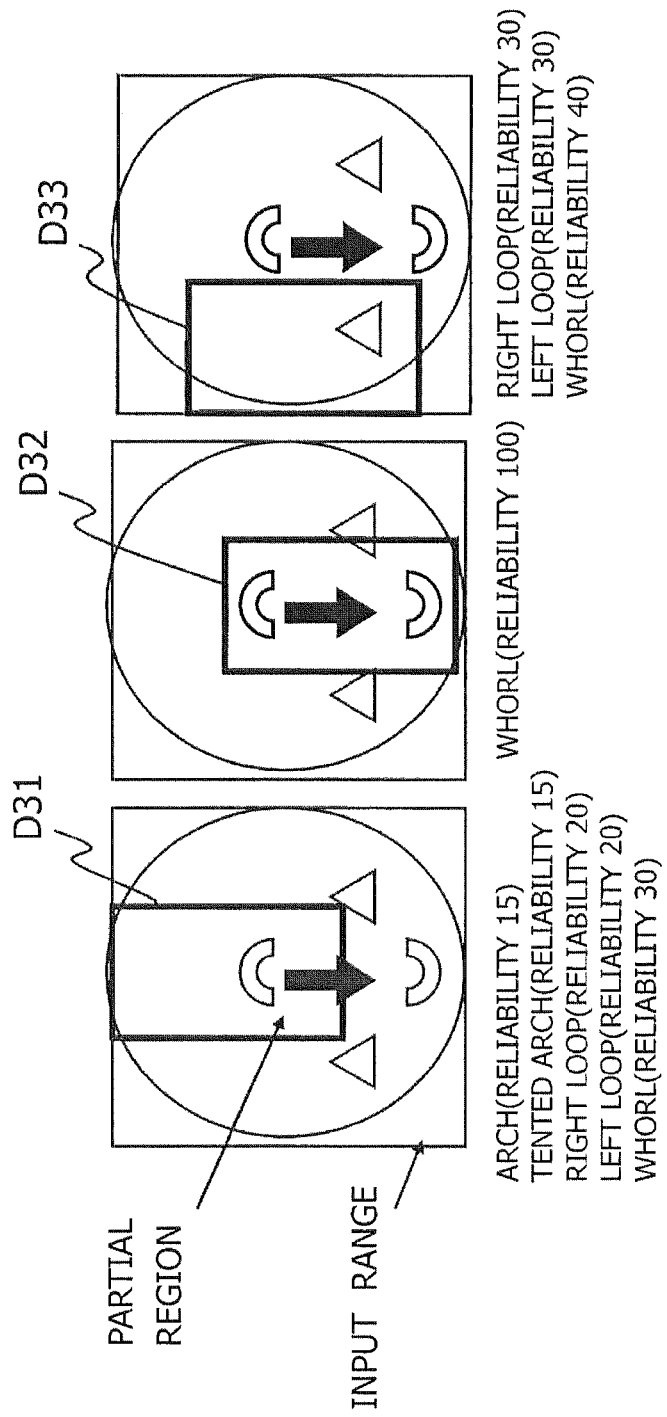

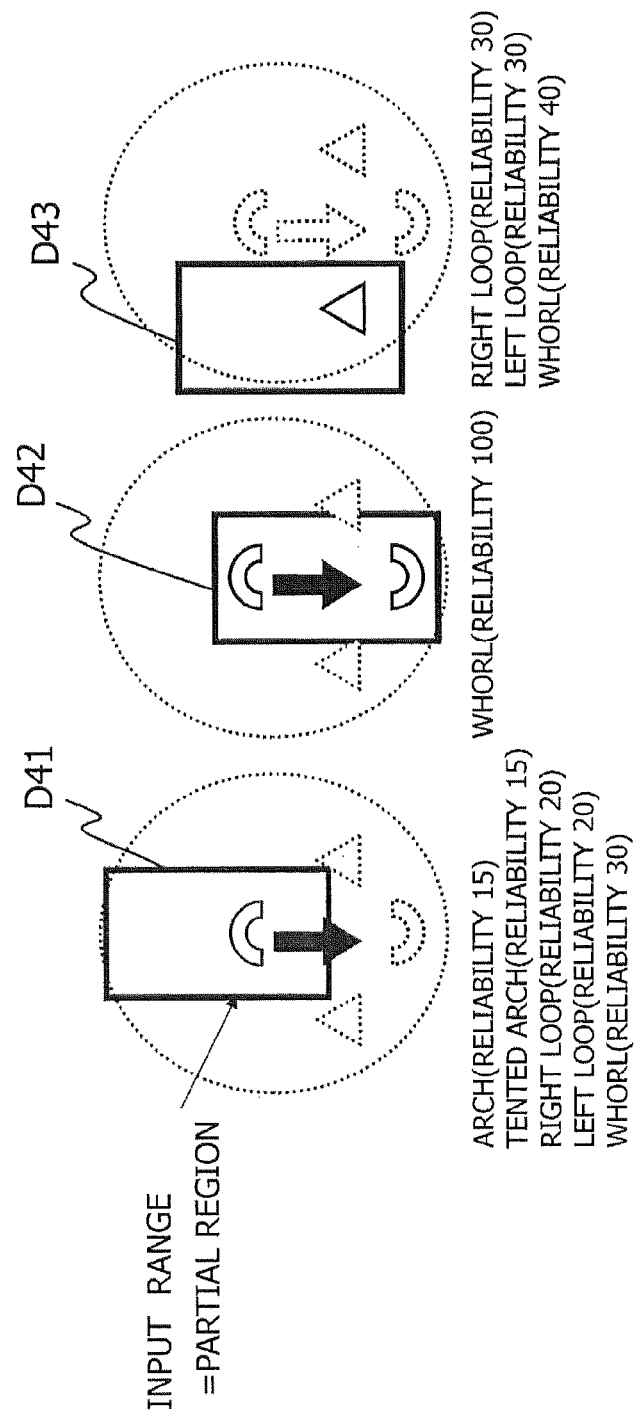

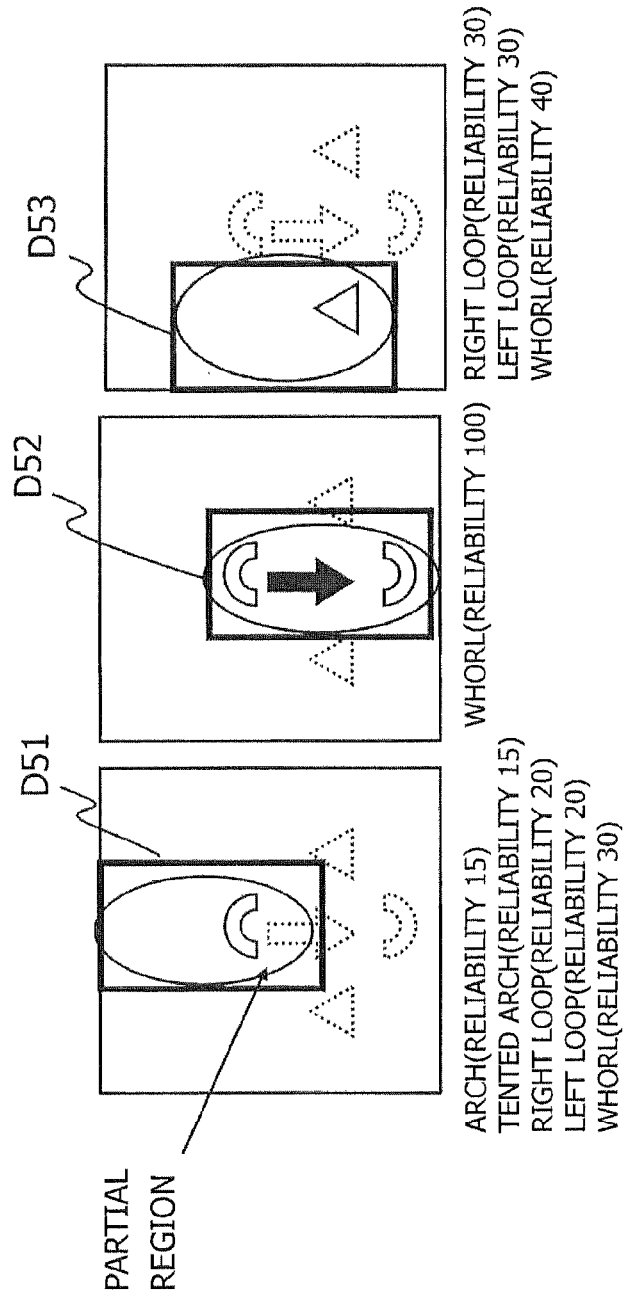

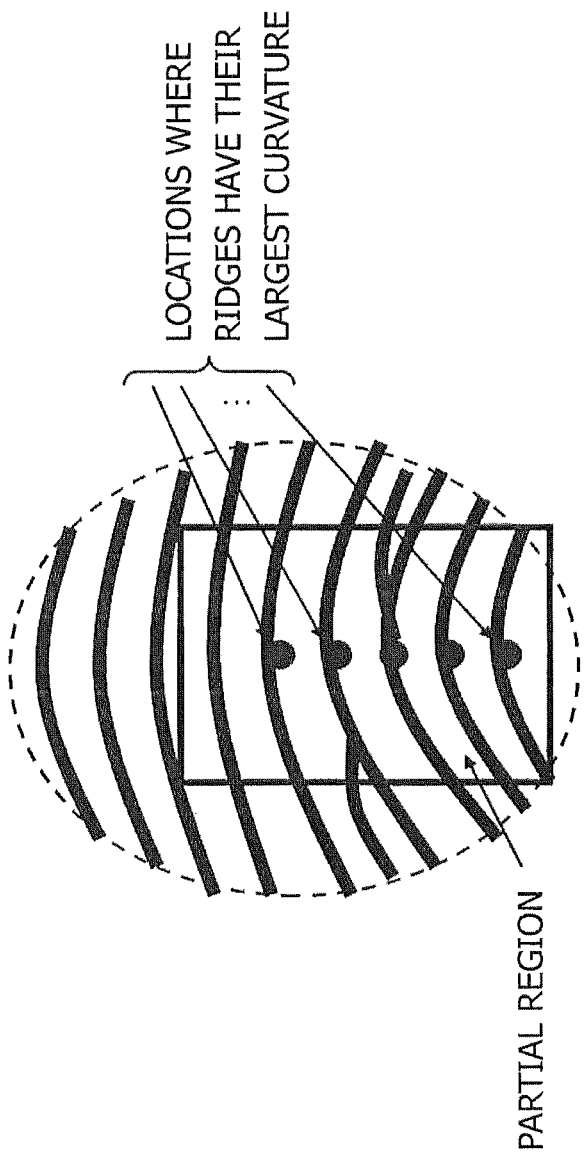

IDENTIFICATION APPARATUS, IDENTIFICATION METHOD, AND PROGRAM

CROSS-REFERENCE TO RELATED APPLICATION

This application is a continuation of International Application PCT/JP2010/054851, filed on Mar. 19, 2010, and designated the U.S., the entire contents of which are incorporated herein by reference.

FIELD

The present invention relates to an identification apparatus adapted to identify biometric data of a user out of registered biometric data when biometric data of the same user is entered.

BACKGROUND

Examples of security on information processing devices such as a personal computer (hereinafter referred to as a PC) include personal authentication based on biometric information (biometrics). When a fingerprint is used in biometric personal authentication, the fingerprint is collected from a finger of a user as image information using a capacitive fingerprint sensor or optical fingerprint sensor. The fingerprint of the user is collected as image information about a pattern made up of, for example, ridges which can touch a touch surface of the fingerprint sensor and valleys which does not touch the touch surface. Feature information is extracted from biometric data on a collected fingerprint image. Then, by matching the extracted feature information against pre-registered feature information, it is determined whether or not the user is really who he/she claims to be, i.e., personal authentication is performed. Examples of feature information on a fingerprint image as biometric data include positional information on ridge bifurcations or ridge endings of ridges. Incidentally, the biometric data is data, such as a fingerprint image, collected from a living body of the user. The feature information is information about features of the user's living body and is extracted from the biometric data.

Also, methods for matching entered biometric data or feature information against registered biometric data or feature information include a method known as 1:N matching. The 1:N matching is a method for identifying biometric data or feature information of a matching user out of multiple items of pre-registered biometric data or feature information when biometric data of a user is entered, and does not involve identifier input or other similar processes for identifying the user. The 1:N matching involves a complicated process when the entered biometric data or feature information is matched against all the registered biometric data or feature information. Therefore, matching is sometimes done after narrowing down the biometric data or feature information which can be match candidates. For example, there is a technique which, using classification into classes, narrows down match candidates to biometric data or feature information registered in classes into which entered biometric data or feature information is classified based on similarity of biometric data.

PATENT DOCUMENT

[Patent document 1] Japanese Patent Publication No. 2006-39777

[Patent document 2] Japanese Patent Publication No. 2006-72429

SUMMARY

However, when 1:N matching is performed using classification into classes, if the classification into classes fails during registration or identification of biometric data, even a registered user himself/herself could be rejected or an unregistered user could be accepted. That is, the use of classification into classes for 1:N matching might reduce authentication accuracy.

For example, if a sensor device for use to enter biometric information is smaller than a living body such as a finger, classification into classes could fail due to failure to obtain sufficient information for the classification.

FIG. 24 is an example of a fingerprint image obtained by a contact sensor device. The outer frame indicated by a broken line represents a range needed for accurate matching. The inner frame indicated by solid lines represents a range of the fingerprint image scanned by the contact sensor device.

If the scanning range of the sensor device is small compared to the range needed for matching as illustrated in FIG. 24, it is highly likely that the classification of biometric data into classes will fail during registration or identification due to insufficiency of information for the classification.

If the classification of biometric data into classes fails, the probability of a registered user himself/herself failing to be authenticated (false reject rate) will increase and the probability of an unregistered user being accepted (false accept rate) will increase. The failure of classification into classes may result in decreased authentication accuracy.

According to an aspect of the embodiments, an identification apparatus includes a classification unit that determines two or more classes into which to classify input biometric data out of a plurality of classes based on features of the input biometric data, where a plurality of items of registered biometric data have been classified into at least one of the plurality of classes; a calculation unit that calculates similarity between the input biometric data and each item of the registered biometric data registered in each of the two or more classes into which the input biometric data is classified; and an identification unit that identifies data on a user who has entered the input biometric data among the registered biometric data registered in any of the two or more classes, based on the similarity to the input biometric data.

Another aspect of the present invention is the identification method described above. Other aspects of the present invention can include a program which makes an information processing device perform the identification method and a non-transitory computer-readable recording medium on which the program has been recorded.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12D is a diagram illustrating features of an Arch type fingerprint pattern in an exemplary fashion;

FIG. 13 summarizes features of the Whorl type, Right Loop type, Left Loop type, Arch type, and Tented Arch type in a table;

FIG. 15A is a diagram illustrating an example of a table which defines classes resulting from classification based on singular points and a center axis as well as defines reliability of the classes;

FIG. 15B is a diagram illustrating an example of a table which defines classes resulting from classification based on singular points and a center axis as well as defines reliability of the classes;

FIG. 19 is a diagram illustrating an exemplary configuration of an identification apparatus;

FIG. 20A is a diagram illustrating examples of relationship between an input range of entered biometric data (fingerprint image) and a partial region extracted by the partial region extraction unit;

FIG. 20B is a diagram illustrating examples of relationship between an input range of entered biometric data (fingerprint image) and a partial region extracted by the partial region extraction unit;

FIG. 20C is a diagram illustrating examples of relationship between an input range of entered biometric data (fingerprint image) and a partial region extracted by the partial region extraction unit;

FIG. 21 illustrates an example of biometric data (fingerprint image) which does not contain a singular point;

DESCRIPTION OF EMBODIMENTS

Modes for carrying out the present invention (hereinafter referred to as embodiments) will be described below with reference to drawings. However, configurations of the embodiments described below are exemplary and not intended to limit the present invention.

First Embodiment

According to a first embodiment, during registration, an identification apparatus registers feature information of biometric information by classifying the feature information into one or more classes. During matching, the identification apparatus also classifies entered biometric information into one or more classes. The identification apparatus identifies the entered biometric information by matching the entered biometric information against each item of feature information classified into the same one or more classes as the entered biometric information. In the first embodiment, a personal authentication process which uses a fingerprint as biometric information will be described.

<<Configuration of Identification Apparatus>>

Figure 1:
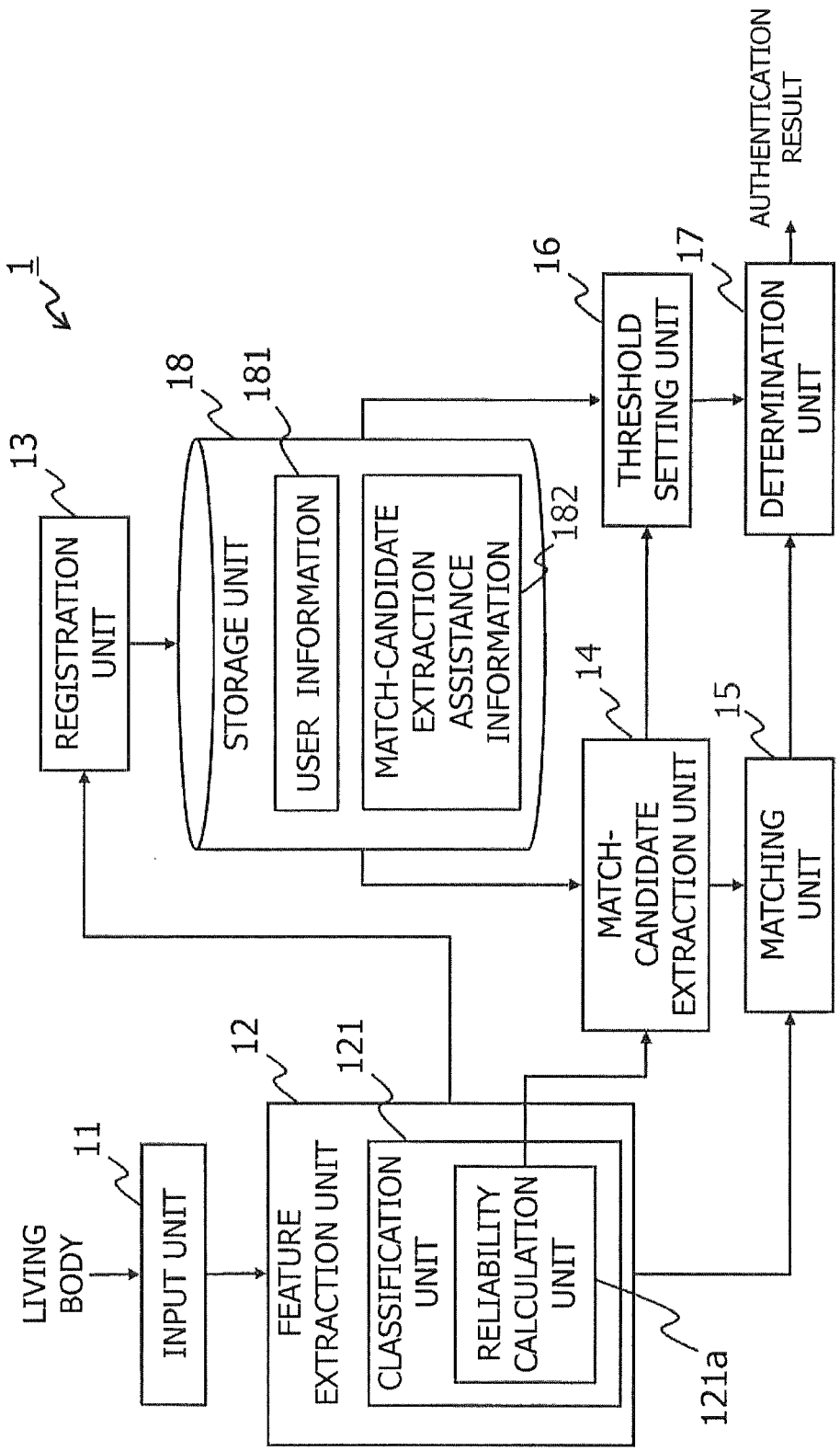
FIG. 1 is a diagram illustrating an exemplary configuration of the identification apparatus.
Figure 2:
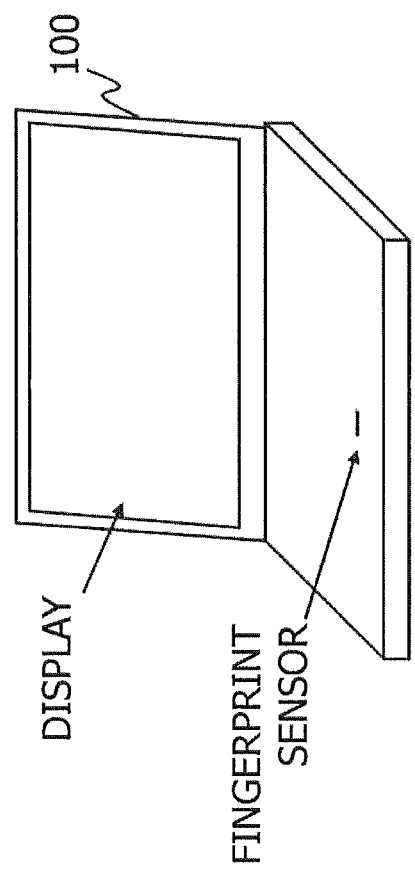
FIG. 2 is a diagram illustrating an exemplary appearance of the identification apparatus.

FIG. 1 is a diagram illustrating an exemplary configuration of the identification apparatus. FIG. 2 is a diagram illustrating an exemplary appearance of the identification apparatus.

The identification apparatus 1 is, for example, a computer equipped with a fingerprint sensor and a display as illustrated in FIG. 2. The identification apparatus 1 checks authentication of a user logging, for example, onto the computer serving as the identification apparatus 1. The computer illustrated in FIG. 2 includes a processor, main memory, auxiliary memory, input devices, output devices, a network interface, and the like.

The computer can implement functions which suit predetermined purposes through execution of a program loaded into a working area of the main memory from a recording medium and executed by the processor.

The processor is, for example, a CPU (Central Processing Unit) or DSP (Data Signal Processor). The main memory includes, for example, a RAM (Random Access Memory) and ROM (Read Only Memory). The main memory provides a working area for the CPU. The auxiliary memory is a non-volatile recording medium such as an EPROM (Erasable Programmable ROM) or HDD (Hard Disk Drive). Also, the auxiliary memory includes disk recording media such as a DVD (Digital Versatile Disc) and CD (Compact Disc) or portable recording media such as flash memory.

The input devices include a keyboard, a pointing device, a mouse, a video/image input device such as a camera, and a voice input device such as a microphone in addition to a fingerprint sensor. The output devices include a printer and a voice output device such as a speaker in addition to a display.

The network interface is, for example, a LAN (Local Area Network) interface board or wireless communications circuit for wireless communications.

The fingerprint sensor is, for example, a capacitive fingerprint sensor or optical fingerprint sensor. Also, the fingerprint sensor may be contained in the PC or provided as a separate external device. In the first embodiment, description is given of a case in which a capacitive fingerprint sensor is used as the fingerprint sensor.

As the processor executes a program on a recording medium, the computer used as the identification apparatus 1 operates as a feature extraction unit 12, a registration unit 13, a match-candidate extraction unit 14, a matching unit 15, a threshold setting unit 16, and a determination unit 17. An input unit 11 is a capacitive fingerprint sensor attached to the computer used as the identification apparatus 1. A storage unit 18 is created in a storage area of the auxiliary memory either statically or through program execution.

The input unit 11, which is a capacitive fingerprint sensor, has a rectangular touch surface for fingerprint images, where the touch surface has a small area sufficiently shorter than a user's finger and narrower than the width of the finger. The input unit 11 produces images of the fingerprint of the user's finger which moves relative to the touch surface and continuously collects plural partial images of the fingerprint of the user's finger. The input unit 11 outputs the collected plural partial images of the user's fingerprint to the feature extraction unit 12.

The feature extraction unit 12 accepts the partial images of the user's fingerprint as input from the input unit 11. The feature extraction unit 12 reorganizes an image of the fingerprint of the user's finger as biometric data from the entered plural partial images and extracts feature information from the reorganized biometric data.

Figure 3:
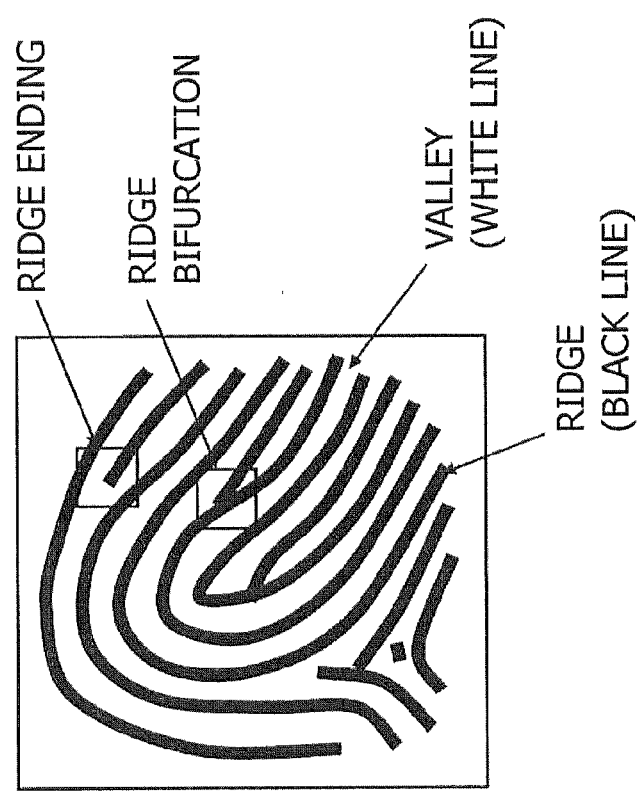
FIG. 3 is a diagram illustrating an example of an entered fingerprint image.

FIG. 3 is a diagram illustrating an example of an entered fingerprint image. The fingerprint image collected by a capacitive fingerprint sensor is a pattern made up of ridges which can touch a touch surface of the fingerprint sensor and valleys which does not touch the touch surface. Minutiae (feature points) include, for example, an ridge ending at which a ridge of the fingerprint terminates and a ridge bifurcation at which a ridge of the fingerprint is divided into two or more branches.

The feature extraction unit 12 extracts ridge endings and ridge bifurcations from the reorganized biometric data (fingerprint image) and detects locations and directions of the extracted ridge endings and ridge bifurcations. Information about the ridge endings and ridge bifurcations extracted from the biometric data (fingerprint image) is referred to as feature information of the biometric data.

The feature extraction unit 12 includes a classification unit 121. Plural classes have been set in the identification apparatus 1 in advance according to features of fingerprint patterns. The classification unit 121 classifies the biometric data into one or more of the plural classes set in advance in the identification apparatus 1.

The classification unit 121 includes a reliability calculation unit 121a. The reliability calculation unit 121a calculates reliability of the entered biometric data for each of the classes. The reliability is a numeric value which represents the fitness of the biometric data for a given class, i.e., the degree to which the biometric data satisfies conditions for being classified into the given class.

The reliability calculation unit 121a is implemented, for example, by a teaching machine which uses multiple preset fingerprint patterns as teacher data. For example, a teaching machine which implements non-linear classification into classes, such as a neutral network or genetic algorithm, can be used for the reliability calculation unit 121a.

Figure 4:
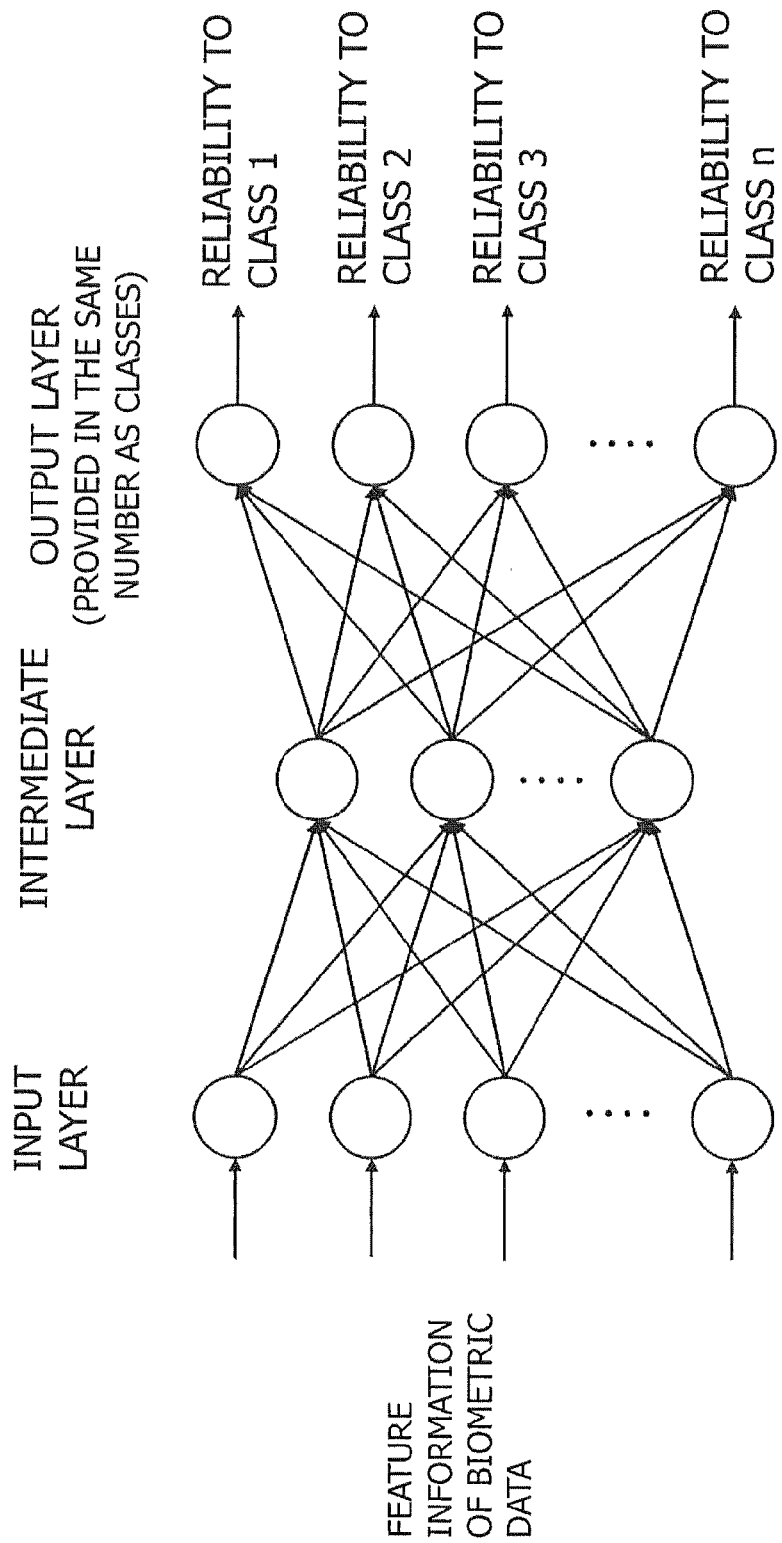
FIG. 4 is a diagram illustrating an example of a neutral network used to calculate reliability.

FIG. 4 is a diagram illustrating an example of a neutral network used to calculate reliability. The reliability calculation unit 121a calculates reliability using, for example, the neutral network illustrated in FIG. 4.

As illustrated in FIG. 4, the neutral network is implemented by an error back-propagation method made up of three layers of an input layer, intermediate layer, and output layer. When a neutral network is used in the reliability calculation by the reliability calculation unit 121a, as many neurons as there are classes are provided in the output layer. The neurons contained in the neutral network have learned the reliability of the biometric data for each of the classes, with the biometric data serving as teacher data.

The reliability calculation unit 121a inputs, for example, feature information of the biometric data to the neutral network and obtains output from each of the neurons in the output layer, where the feature information of the biometric data includes the number of ridge endings and number of ridge bifurcations contained in the feature information. The reliability calculation unit 121a uses a result of output from each of the neurons in the output layer as reliability of the entered biometric data for each of the classes.

The classification unit 121 classifies the feature information of the biometric data into any class for which the reliability of the feature information of the biometric data exceeds a classification threshold, the reliability being calculated by the reliability calculation unit 121a. In so doing, if there are plural classes for which the reliability exceeds the classification threshold, the classification unit 121 classifies the feature information of the biometric data into the plural classes which apply.

During a registration process, the feature extraction unit 12 outputs a user identifier, the feature information of the biometric data, the reliability calculated by the reliability calculation unit 121a for each of the classes, and the classes yielded by the classification unit 121, to the registration unit 13. During an identification process, the feature extraction unit 12 outputs the classes into which the feature information of the biometric data has been classified by the classification unit 121 to the match-candidate extraction unit 14 and outputs the feature information of the user's biometric data and the reliability of the feature information for each of the classes to the matching unit 15.

The registration unit 13 stores information in the storage unit 18 and updates information held in the storage unit 18. The registration unit 13 accepts, as input, the user identifier, the feature information of the user's biometric data, the reliability for each of the classes, and the classes yielded as a result of classification from the feature extraction unit 12. The registration unit 13 stores the information about the biometric data received from the feature extraction unit 12 in the storage unit 18 together with needed information such as update dates/times of the information.

The storage unit 18 holds user information 181 and match-candidate extraction assistance information 182. The user information 181 is information about users' biometric data registered in the identification apparatus 1, and the data is held on a user by user basis. The match-candidate extraction assistance information 182 is information used to efficiently extract match candidates during an identification process of the entered biometric data and is information about classes including information about the biometric data registered in each class.

Figure 5:
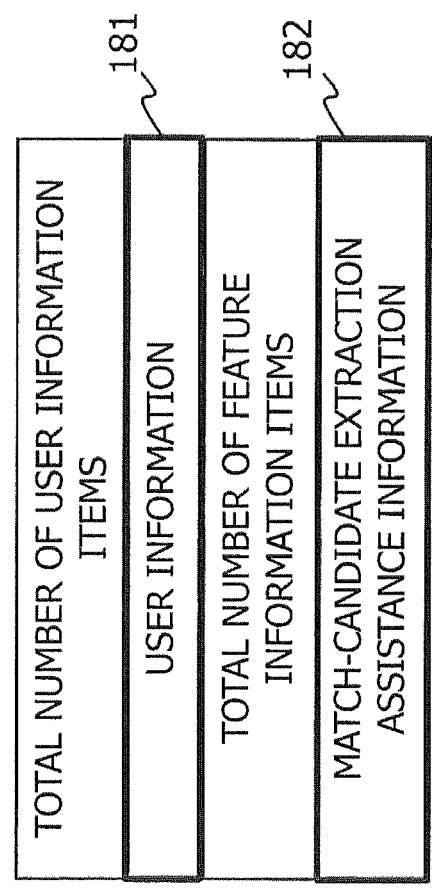
FIG. 5 is a diagram illustrating an exemplary data structure of the data stored in the storage unit 18.

FIG. 5 is a diagram illustrating an exemplary data structure of the data stored in the storage unit 18. The storage unit 18 stores the total number of user information items, the user information 181, the total number of feature information items, and the match-candidate extraction assistance information 182. The total number of user information items is a numeric value which represents the number of user information items held in the storage unit 18. The total number of feature information items is a numeric value which represents the number of feature information items held in the storage unit 18. The total number of user information items and total number of feature information items may differ in value because multiple items of biometric data may be registered for a single user. Besides, the total number of user information items and total number of feature information items are updated by the registration unit 13 when user information and feature information are newly stored in the storage unit 18.

Figure 6:
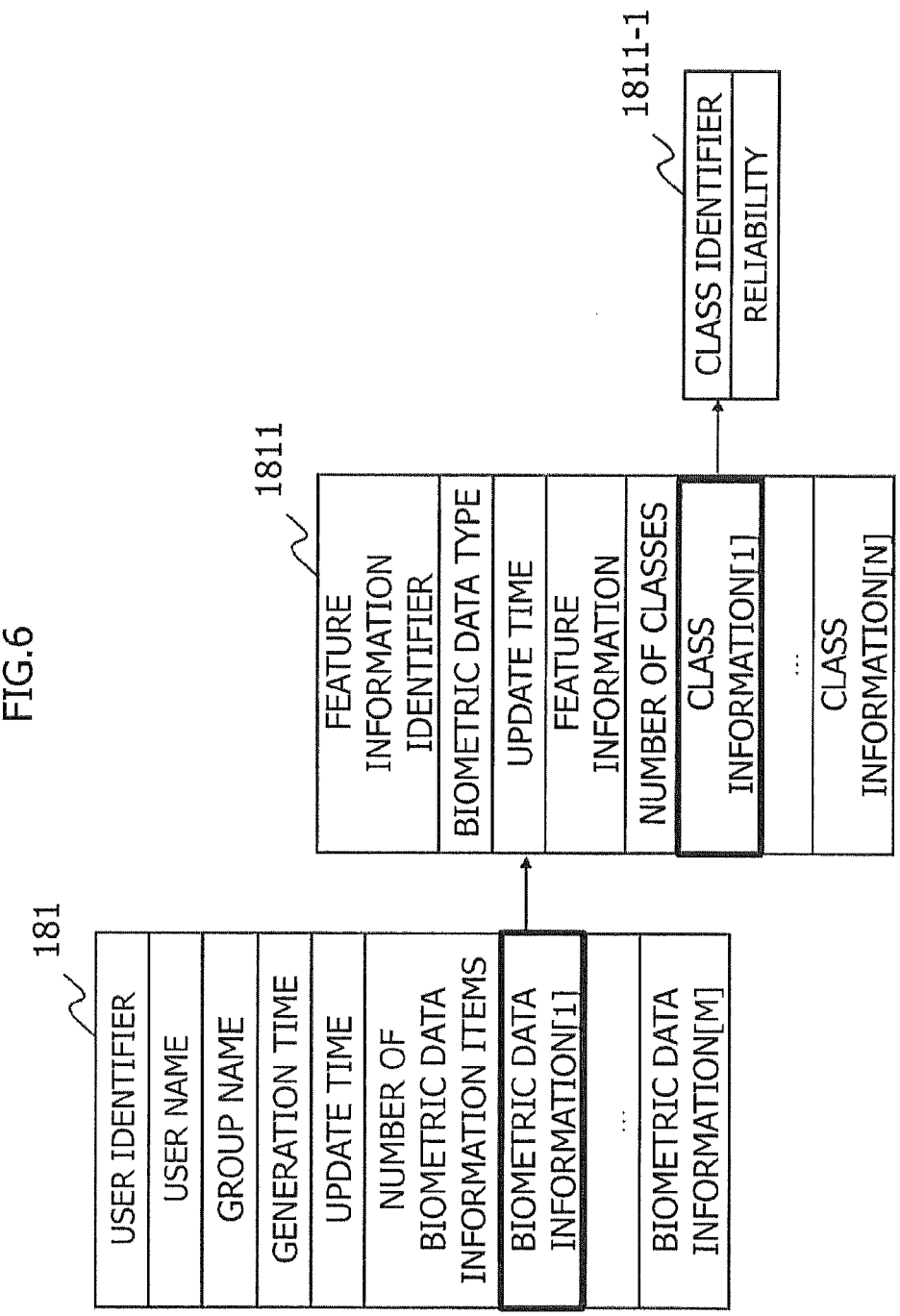
FIG. 6 is a diagram illustrating an exemplary data structure of the user information.

FIG. 6 is a diagram illustrating an exemplary data structure of the user information 181. The user information 181 is user-related information registered in the identification apparatus 1 and includes a user identifier, a user name, a group name, generation time, update time, the number of biometric data information items, and biometric data information 1811 on each biometric data item.

The user identifier is an identifier used to identify a user and is a string of alphanumeric characters which does not duplicate among users. The user name is specified by the user when the biometric data is registered, and may be the real name of the user or a nickname. For example, the user name is used to log onto the computer serving as the identification apparatus 1. The group name is the name of a group to which the user belongs and which is organized, for example, on a department by department basis. The generation time is the time at which the user information is stored in the storage unit 18. The update time is the time at which the user information is updated. The generation time and update time are stored by the registration unit 13 when the user information is registered and updated. The number of biometric data information items is a numeric value which represents the number of items of the biometric data information 1811 on the user's biometric data registered in the identification apparatus 1. The number of biometric data information items is updated by the registration unit 13 when the biometric data information 1811 on the user's biometric data is newly registered. The user information 181 contains as many items of biometric data information 1811 as the numeric value corresponding to the number of biometric data information items.

The biometric data information 1811 is information about the feature information of the user's biometric data registered in the identification apparatus 1. The biometric data information 1811 includes a feature information identifier, a biometric data type, update time, feature information, the number of classes, and class information 1811-1 on each class.

The feature information identifier is an identifier used to identify feature information of the biometric data registered in the identification apparatus 1 and is a string of alphanumeric characters which does not duplicate among items of feature information. The biometric data type represents the type of biometric data. Possible biometric data types include, for example, fingerprint, palm print, nose pattern, hand geometry, palm vein pattern, finger vein pattern, voice print, facial appearance, auricle, and the like. According to a first embodiment, since a fingerprint image of the user is entered as biometric data via the input unit 11 of the identification apparatus 1, "fingerprint" is stored in the biometric data type of the biometric data information 1811. The update time is the time at which the biometric data information 1811 is updated and is stored by the registration unit 13 upon updating. The feature information is the feature information of the biometric data inputted to the registration unit 13 from the feature extraction unit 12 and registered by the registration unit 13. The number of classes is a numeric value which represents the number of classes set in the identification apparatus 1.

The class information 1811-1 is information about each class set in the identification apparatus 1 and includes a class identifier and reliability. The class identifier is an identifier used to identify a class and is a string of alphanumeric characters which does not duplicate among classes. The reliability is the reliability of the feature information for the class and is calculated by the reliability calculation unit 121*a*.

Figure 7:
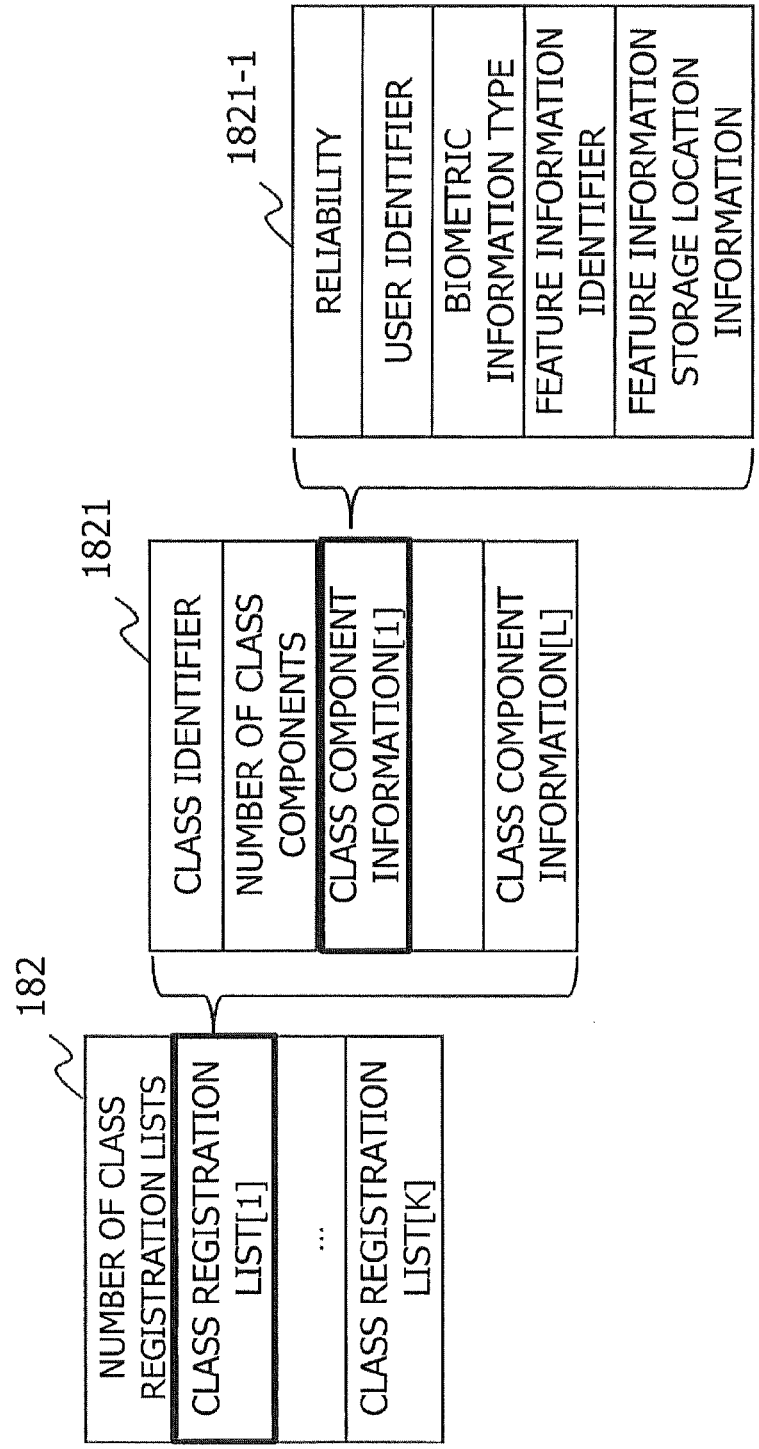
FIG. 7 is a diagram illustrating an exemplary data structure of the match-candidate extraction assistance information.

FIG. 7 is a diagram illustrating an exemplary data structure of the match-candidate extraction assistance information 182. The match-candidate extraction assistance information 182 has a list of biometric data registered for each of preset classes.

The match-candidate extraction assistance information 182 includes the number of class registration lists and a class registration list 1821 for each registered class. The number of class registration lists is the number of class registration lists and is the same numeric value as the number of classes registered in the identification apparatus 1.

The class registration list 1821 is a list of feature information of the biometric data registered in the class. The class registration list 1821 includes a class identifier, the number of class components, and class component information 1821-1, wherein the number of the class components information 1821-1 is equal to the numeric value indicated by the number of class components.

The number of class components is a numeric value which represents the number of feature information items of the biometric data classified into the class. The number of class components is updated by the registration unit 13 when feature information of the biometric data is newly registered in the class.

The class component information 1821-1 is information about the feature information of the biometric data classified into the class. The class component information 1821-1 includes reliability, a user identifier, a biometric information type, a feature information identifier, and feature information storage location information. The reliability is the reliability of the feature information of the biometric data for the class and is calculated by the reliability calculation unit 121*a*. The feature information storage location information represents a location where the feature information is held, i.e., the biometric data information 1811 of the user information 181 in which the feature information is stored.

The registration unit 13 accepts a user identifier, the feature information of the user's biometric data, the reliability for each of the classes, and the classes yielded as a result of classification as input from the feature extraction unit 12 and registers the accepted data in the user information 181 and match-candidate extraction assistance information 182 having data structures such as illustrated in FIG. 6 and FIG. 7.

During the identification process of the biometric data, the match-candidate extraction unit 14 receives the class(es) into which the feature information of the entered biometric data has been classified by the classification unit 121 as input from the feature extraction unit 12.

Hereinafter, the feature information of the biometric data entered in the identification apparatus 1 during the identification process of biometric data will be referred to as input data. The feature information of the biometric data registered in the identification apparatus 1, i.e., the feature information of the biometric data held in the storage unit 18 will be referred to as registered data.

Out of the registered data contained in one or more classes into which the input data is classified in all registered data, the match-candidate extraction unit 14 extracts registered data whose reliability is equal to or higher than an extraction threshold as match candidates for the input data. The extraction threshold is used to further narrow down match candidates when a lot of registered data is contained in one or more classes into which the input data is classified and is a value equal to or larger than the classification threshold.

From the match-candidate extraction assistance information 182 in the storage unit 18, the match-candidate extraction unit 14 generates a list of appropriate registered data as match-candidate extraction result information. The match-candidate extraction result information is generated for each of the classes into which the input data is classified. The same data structure as that of the class registration list can be used for the match-candidate extraction result information.

Incidentally, when the extraction threshold coincides with the classification threshold used in classifying the input data and registered data into classes, the class registration list can be used, as it is, as the match-candidate extraction result information.

The match-candidate extraction unit 14 outputs the match-candidate extraction result information to the matching unit 15 and threshold setting unit 16.

The matching unit 15 accepts as input the feature information (input data) of the user's biometric data and the reliability of the feature information for each of the classes from the feature extraction unit 12 during the identification process of biometric data. The matching unit 15 accepts as input the match-candidate extraction result information for each of the classes into which the input data is classified from the match-candidate extraction unit 14.

The matching unit 15 matches the input data with the registered data contained in the match-candidate extraction result information for each of the classes into which the input data is classified and determines the similarity of the input data to each item of the registered data. A minutiae-based method calculates similarity using differences in Euclidean distance or in angle between minutiae (feature points) which are associated between feature information of input data and feature information of registered data. Furthermore, when minutiae are used, the similarity may be calculated based on the number of ridges between a pair of minutiae which are associated between sets of feature information or on distances along ridges and valleys between a pair of minutiae.

After calculating the similarity of the input data to each item of the registered data contained in the match-candidate extraction result information for each of the classes into which the input data is classified, the matching unit 15 outputs the match-candidate extraction result information, the calculated similarity, and the reliability of the input data for each of the classes to the determination unit 17.

The threshold setting unit 16 accepts as input the match-candidate extraction result information for each of the classes into which the input data is classified from the match-candidate extraction unit 14. The threshold setting unit 16 sets an identification determination threshold for each of the classes into which the input data is classified. The identification determination threshold is a threshold of similarity between input data and registered data and is used to determine that the registered data belongs to the same user as the input data.

For example, the threshold setting unit 16 determines a false accept rate of each class based on a false accept rate (FAR) of the identification apparatus 1 and determines the identification determination threshold for the class according to the false accept rate of the class. The identification determination threshold set for the class i is denoted by $T_i$. The false accept rate expected of the entire identification apparatus 1 is denoted by FAR. The false accept rate of the class i is denoted by $FAR(T_i)$. The ratio of the number of registered data items extracted as match candidates in the class i by the match-candidate extraction unit 14, i.e., the ratio of the registered data whose reliability is higher than the extraction threshold in the class i, to the total number of the feature information items registered in the identification apparatus 1 is denoted by $R_i$.

A relationship between the false accept rate FAR of the identification apparatus 1 and the false accept rate $FAR(T_i)$ of class 1 is given by Eq. 1 below.

$$FAR = FAR(T_i) \times R_i \qquad \text{Eq. 1}$$

$$R_i = \frac{\text{The number of feature information items contained in the class } i \text{ and having reliability higher than the extraction threshold}}{\text{The total number of feature information items registered in the identification apparatus 1}}$$

When 1:N matching is performed with respect to feature information items which are N in number using a matching unit whose false accept rate in 1:1 matching is FAR11, a false accept rate FAR1N in the 1:N matching is estimated to be as given by Eq. 2.

$$FAR1N = N \times FAR11 \qquad \text{Eq. 2}$$

As can be seen from Eq. 2, when the feature information is narrowed down, the FAR1N in the 1:N matching is reduced. In contrast, if the false accept rate FAR1N is constant, when the number N of feature information items is reduced, the false accept rate FAR11 is increased accordingly. That is, to permit the false accept rate FAR11 to take a large value, the number N of feature information items can be reduced.

For example, if a ratio R1 of the registered data in class 1 is 0.1 and the false accept rate FAR expected of the identification apparatus 1 is 0.0001, it follows from Eq. 1 that the false accept rate FAR(T1) expected of the class 1 is 0.001. That is, when the feature information used as match candidates is narrowed down to 0.1, the false accept rate FAR(T1) expected of the class 1 is relaxed to 10 times the false accept rate FAR expected of the identification apparatus 1. The threshold setting unit 16 determines the identification determination threshold T1 for the class 1 such that the false accept rate FAR(T1) expected of the class 1 will be 0.001.

Figure 8:
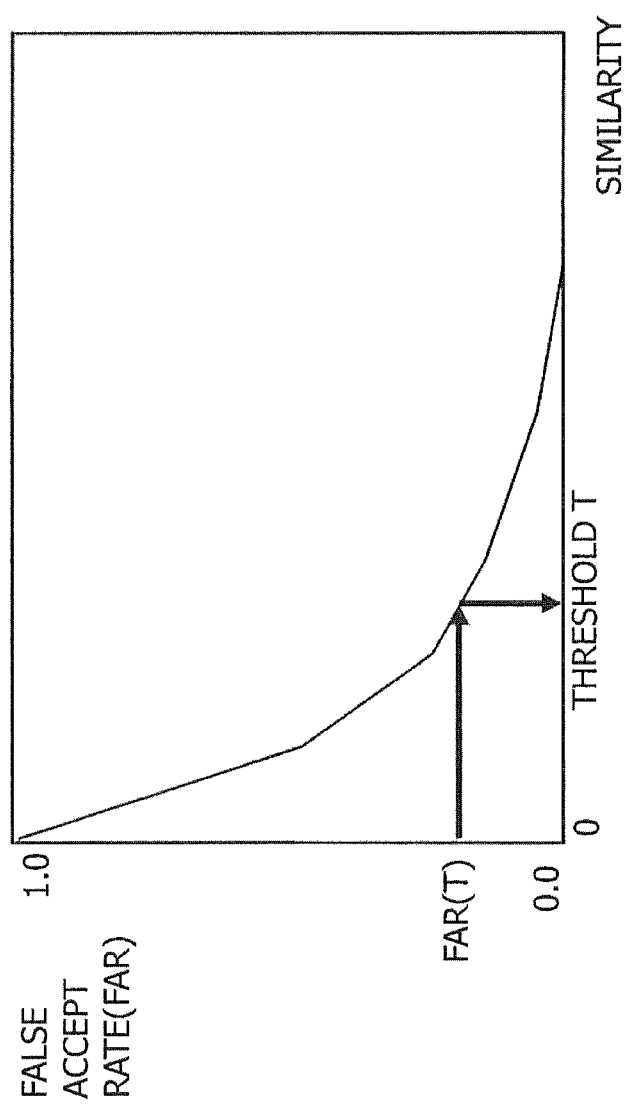
FIG. 8 is a diagram illustrating an example of relationship between similarity and false accept rate.

FIG. 8 is a diagram illustrating an example of relationship between similarity and false accept rate. Since the relationship between similarity and false accept rate is available as discrete data, FIG. 8 is a result of applying interpolation such as linear interpolation to a relationship between similarity and false accept rate defined by a table.

As illustrated in FIG. 8, the relationship between similarity and false accept rate is such that the similarity increases with decreases in the false accept rate and decreases with increases in the false accept rate. Therefore, if the number N of feature information items is reduced, the false accept rate $FAR(T_i)$ expected of the class i can be made more relaxed than the false accept rate FAR expected of the identification apparatus 1, and consequently the identification determination threshold for the class i can be set to a smaller value.

Once the false accept rate $FAR(T_i)$ expected of the class i is determined, the threshold setting unit 16 determines the identification determination threshold for the class i based on, for example, a table of relationship between similarity and false accept rate, such as illustrated in FIG. 8, where the table is held in the storage unit 18.

The threshold setting unit 16 determines the identification determination threshold for each of the classes into which the input data is classified. In determining the identification determination threshold for the classes, the threshold setting unit 16 may use a common table of relationship between similarity and false accept rate (FIG. 8) for the classes or may use a class-specific table of relationship between similarity and false accept rate.

The threshold setting unit 16 outputs the identification determination threshold for each of the classes into which the input data is classified to the determination unit 17.

The determination unit 17 accepts as input the match-candidate extraction result information on each of the classes into which the input data is classified, the similarity of the input data to the item of the registered data contained in each item of the match-candidate extraction result information, the reliability of the input data for each of the classes, and the identification determination threshold for each of the classes into which the input data is classified. The determination unit 17 compares the similarity of the registered data to the input data with the identification determination threshold for each of the classes into which the input data is classified, by handling the classes in descending order of input data reliability. First, the determination unit 17 compares the similarity of each item of registered data with the identification determination threshold, in the class with the highest input data reliability.

The determination unit 17 determines, when the similarity of any item of registered data exceeds the identification determination threshold for the class, the item of registered data is biometric data belonging to the same user as the input data. The determination unit 17 outputs, as an identification result, the user identifier (contained in the match-candidate extraction result information) associated with the item of registered data.

When there are plural items of registered data whose similarity exceeds the identification determination threshold for the class, the determination unit 17 determines the item of registered data with the highest reliability as being biometric data belonging to the same user as the input data. The determination unit 17 outputs, as an identification result, the user identifier associated with the item of registered data.

On the other hand, when there is no item of registered data which exceeds the identification determination threshold for the class, the determination unit 17 compares the similarity of each item of registered data with the identification determination threshold, in the class with the next highest reliability.

The determination unit 17 repeats the above processes until identifying an item of registered biometric data belonging to the same user as the input data.

When no item of registered biometric data identified to be belonging to the same user as the input data is found as a result of the comparison between the similarity of each item of registered data with the identification determination threshold in any of the classes into which the input data is classified, the determination unit 17 outputs an identification failure.

Alternatively, the determination unit 17 may extract the item of registered data whose similarity is the highest and exceeds the identification determination threshold from each of the classes into which the input data is classified, and may adopt the item of registered data which has the highest similarity among the extracted items of registered data as an identification result. When there is no item of registered data whose similarity is the highest and exceeds the identification determination threshold in any of the classes into which the input data is classified, the determination unit 17 determines that the identification has failed.

The classification unit 121 corresponds to the classification unit according to an aspect. The matching unit 15 corresponds to the calculation unit according to the aspect. The determination unit 17 corresponds to the identification unit according to the aspect. The threshold setting unit 16 corresponds to the setting unit.

<<Flow of Biometric Data Registration Process>>

Figure 9:
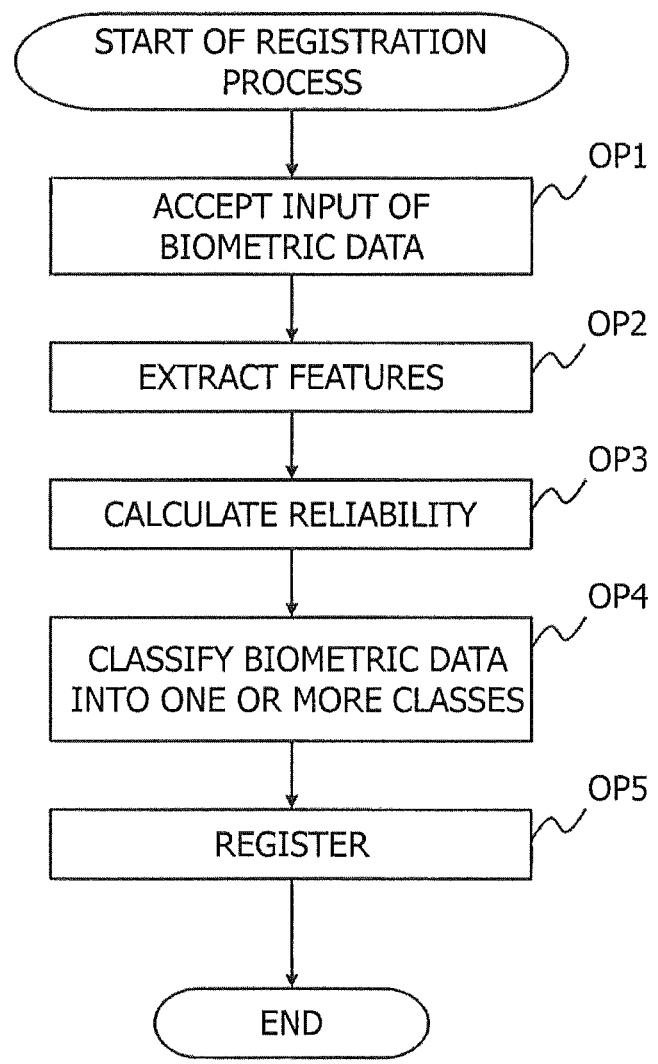
FIG. 9 is a diagram illustrating an exemplary flow of a biometric data registration process of the identification apparatus.

FIG. 9 is a diagram illustrating an exemplary flow of a biometric data registration process of the identification apparatus 1. The identification apparatus 1 starts a biometric data registration process when directed by the user to register biometric data.

The user enters biometric data via the input unit 11 (OP1). The feature extraction unit 12 extracts features from the biometric data entered via the input unit 11 and generates feature information (OP2).

Using the feature information generated by the feature extraction unit 12, the reliability calculation unit 121a calculates the reliability of the feature information of the entered biometric data for each class (OP3). The classification unit 121 classifies the feature information of the entered biometric data into a class or classes for which the calculated reliability exceeds the classification threshold (OP4). The feature information of the entered biometric data is classified by the classification unit 121 into one or more classes.

The registration unit 13 registers registration information on the entered biometric data in the class registration lists of the classes yielded as a result of classification by the classification unit 121 (OP5).

In this way, the identification apparatus 1 calculates the reliability of the feature information of the biometric data for each class, classifies the feature information of the biometric data into classes based on the reliability, and registers the feature information of the biometric data in one or more classes.

<<Flow of Biometric Data Identification Process>>

Figure 10A:
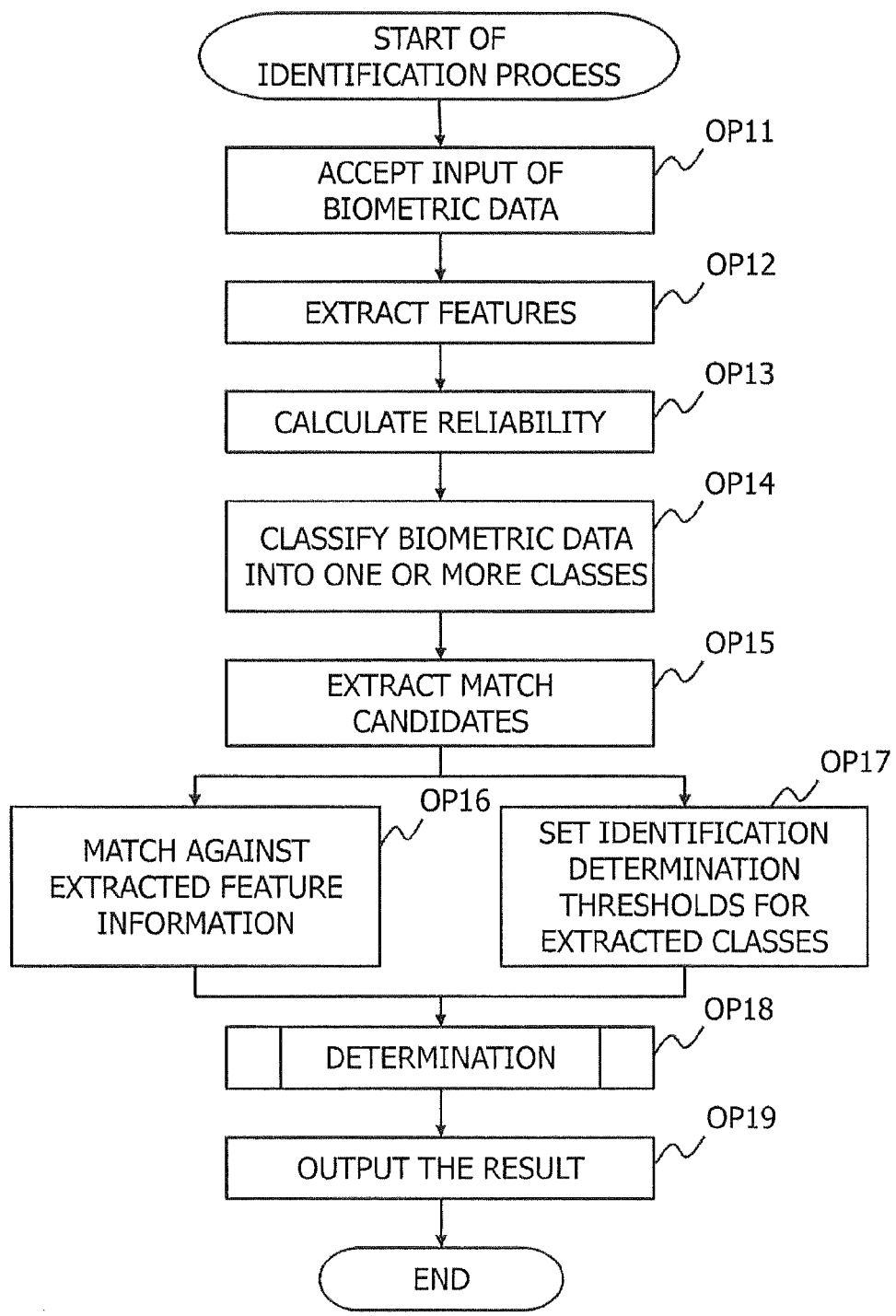
FIG. 10A is diagrams illustrating an exemplary flow of a biometric data identification process of the identification apparatus.
Figure 10B:
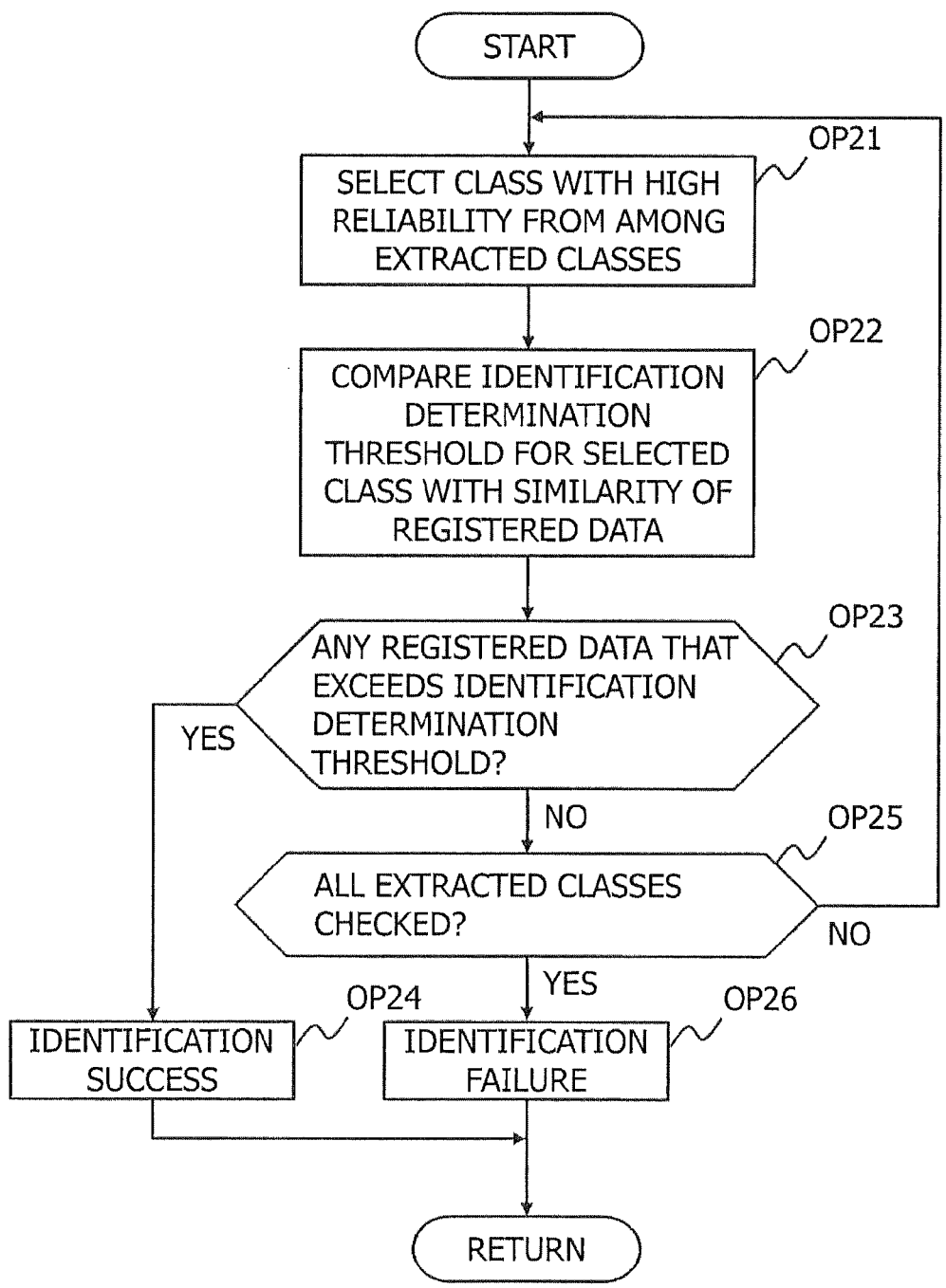
FIG. 10B is diagrams illustrating an exemplary flow of a biometric data identification process of the identification apparatus.

FIG. 10A and FIG. 10B are diagrams illustrating an exemplary flow of a biometric data identification process of the identification apparatus 1. For example, when a user logs onto the computer serving as the identification apparatus 1, the identification apparatus 1 starts a biometric data identification process to check authentication of the user and thereby determine whether to authorize the user to use the computer.

The user enters biometric data via the input unit 11 (OP11). The feature extraction unit 12 extracts features from the biometric data entered via the input unit 11 and generates feature information (OP12).

Using the feature information generated by the feature extraction unit 12, the reliability calculation unit 121a calculates the reliability of the feature information of the entered biometric data (hereinafter such feature information is referred to as input data) for each class (OP13). The classification unit 121 classifies input data into a class or classes for which the calculated reliability exceeds the classification threshold (OP14). The input data is classified by the classification unit 121 into one or more classes.

The match-candidate extraction unit 14 extracts feature information which is registered in the classes into which the input data is classified and whose reliability is higher than the extraction threshold (hereinafter such feature information is referred to as registered data) from the match-candidate extraction assistance information 182 held in the storage unit 18 (OP15). The match-candidate extraction unit 14 generates match-candidate extraction result information for each of the classes into which the input data is classified (see FIG. 7).

The matching unit 15 matches the input data received from the feature extraction unit 12 against each item of the feature information contained in the match-candidate extraction result information for each of the classes into which the input data received from the match-candidate extraction unit 14 is classified and thereby calculates similarity (OP16). The threshold setting unit 16 sets an identification determination threshold for each of the classes into which the input data is classified (OP17).

The determination unit 17 compares the similarity of each item of the registered data calculated by the matching unit 15 with the identification determination threshold for each class set by the threshold setting unit 16 and thereby determines biometric data belonging to the same user as the input data among the registered data (OP18). Concrete processes are as follows (FIG. 10B).

The determination unit 17 selects the class with the highest input data reliability from among the classes into which the input data is classified (OP21). The determination unit 17 compares the identification determination threshold for the selected class with the similarity of the registered data whose reliability is higher than the extraction threshold for the selected class (OP22). The determination unit 17 determines whether or not there is any item of registered data which exceeds the identification determination threshold (OP23).

When there is any item of registered data which exceeds the identification determination threshold (OP23: Yes), the determination unit 17 identifies the item of registered data with the highest similarity among the items of registered data which exceeds the identification determination threshold as biometric data belonging to the same user as the input data and determines that the identification result is a success (OP24). Subsequently, the processing goes to OP19 (FIG. 10A).

When there is no item of registered data which exceeds the identification determination threshold (OP23: No), the determination unit 17 determines whether or not all the classes into which the input data have been classified have been checked (OP25).

When there is any class yet to be checked (OP25: No), the processing returns to OP21 in order for the determination unit 17 to select the class with the next highest input data reliability from among the classes into which the input data is classified. Then, the determination unit 17 repeats the processes of OP22 and OP23.

When all the classes into which the input data has been classified have been checked (OP25: Yes), this means that biometric data belonging to the same user as the input data has not been identified in any of the classes into which the input data has been classified. Consequently, the determination unit 17 determines that the identification result is a failure (OP26). Subsequently, the processing goes to OP19.

The determination unit 17 outputs the identification result (OP19). When the identification result is a success, the determination unit 17 outputs the user identifier of the registered data identified as biometric data belonging to the same user as the input data. When the identification result is a failure, the determination unit 17 outputs an identification failure.

<<Advantageous Effects of First Embodiment>>

The identification apparatus 1 according to the first embodiment registers biometric data by classifying the biometric data into one or more classes during registration and classifies the entered biometric data into one or more classes during identification as well. The identification apparatus 1 matches the entered biometric data against the biometric data registered in the classes into which the entered biometric data is classified and identifies biometric data belonging to the same user as the entered biometric data. During registration and identification, when there are plural classes whose reliability is higher than the classification threshold, by classifying the biometric data into the plural classes, failures in classification into classes can be reduced compared to when a single class is used for classification, and consequently authentication performance can be improved.

Second Embodiment

According to a second embodiment, the identification apparatus uses singular points of a fingerprint as feature information. Also, according to the second embodiment, the identification apparatus performs classification into classes by focusing on fingerprint patterns based on singular points. Incidentally, in the second embodiment, description of part in common with the first embodiment will be omitted.

Figure 11:
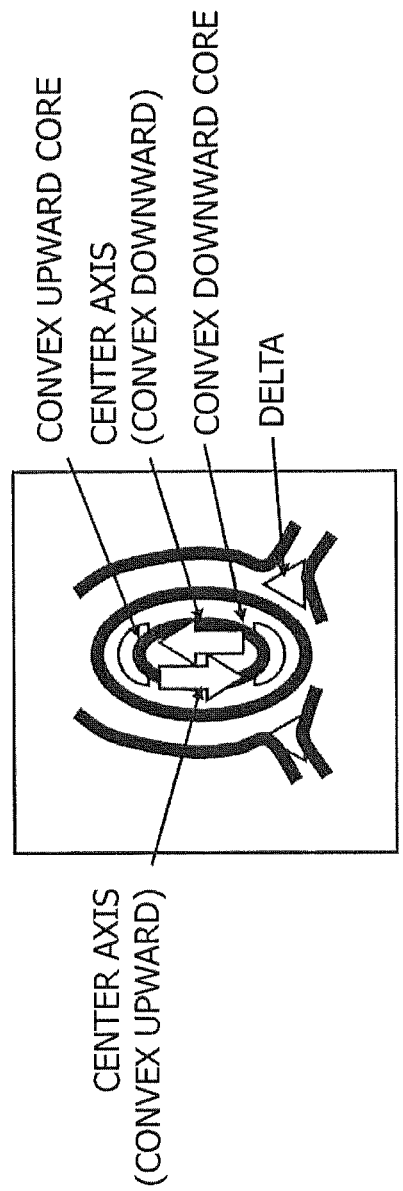
FIG. 11 is a diagram illustrating an example of singular points in a fingerprint.

FIG. 11 is a diagram illustrating an example of singular points in a fingerprint. The singular point is, for example, a part where a ridge in a fingerprint pattern changes sharply.

Singular points include, for example, a fingerprint center where the curvature of the ridges is large and a triangular part where ridges or valleys extend in three directions. The fingerprint center is also called a core and the triangular part is known as a delta.

When it is assumed that the fingertip faces upward, the fingerprint center can have either a convex upward shape or a convex downward shape. According to the second embodiment, a fingerprint center with a convex upward shape is referred to as a convex upward core while a fingerprint center with a convex downward shape is referred to as a convex downward core.

The fingerprint center is a large-curvature portion from which ridges extend, decreasing the curvature gradually. An average direction of the ridges extending from the fingerprint center is known as a center axis.

According to the second embodiment, as illustrated in FIG. 11, singular points such as fingerprint centers and deltas as well as center axes are used as feature information. Also, in the second embodiment, fingerprint patterns classified according to a positional relationship between singular points and center axes are used as classes.

Based on singular points and center axes, fingerprint patterns are classified, for example, into a Whorl type, Right Loop type, Left Loop type, Arch type, and Tented Arch type.

FIG. 12A, FIG. 12B, FIG. 12C, FIG. 12D, and FIG. 12E illustrate examples of how fingerprint patterns are classified based on singular points and center axes. FIG. 13 summarizes features of the Whorl type, Right Loop type, Left Loop type, Arch type, and Tented Arch type in a table. In FIG. 12A, FIG. 12B, FIG. 12C, FIG. 12D, and FIG. 12E, the fingerprint center, delta, and center axis are represented with symbols.

Figure 12A:
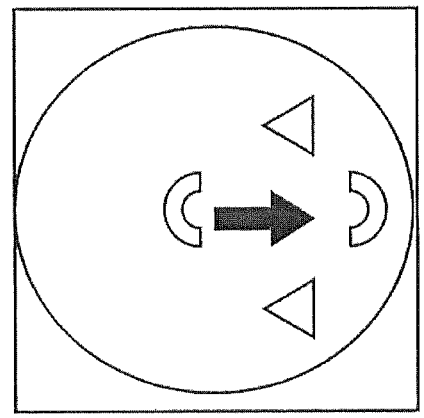
FIG. 12A is a diagram illustrating features of a Whorl type fingerprint pattern in an exemplary fashion.

FIG. 12A is a diagram illustrating features of a Whorl type fingerprint pattern in an exemplary fashion. Fingerprint patterns classified into the Whorl type are characterized in that there are one convex upward core, one convex downward core, and two deltas and that the two deltas are located on both sides of a center axis (see FIG. 13).

Figure 12B:
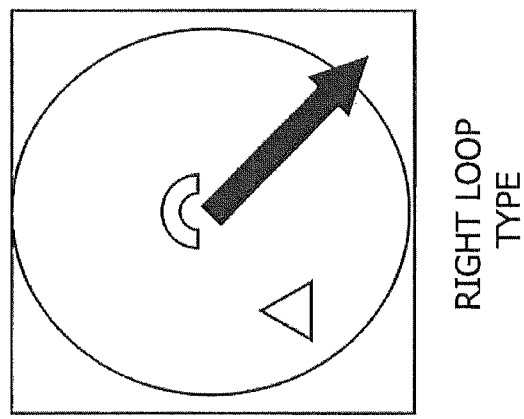
FIG. 12B is a diagram illustrating features of a Right Loop type fingerprint pattern in an exemplary fashion.

FIG. 12B is a diagram illustrating features of a Right Loop type fingerprint pattern in an exemplary fashion. Fingerprint patterns classified into the Right Loop type are characterized in that there are one convex upward core and one delta and that the delta is located on the observers' left side of a center axis (see FIG. 13).

Figure 12C:
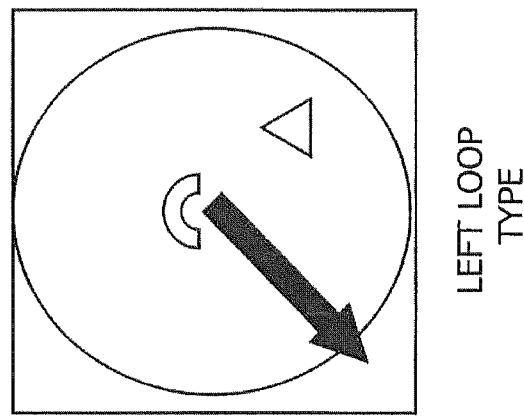
FIG. 12C is a diagram illustrating features of a Left Loop type fingerprint pattern in an exemplary fashion.

FIG. 12C is a diagram illustrating features of a Left Loop type fingerprint pattern in an exemplary fashion. Fingerprint patterns classified into the Left Loop type are characterized in that there are one convex upward core and one delta and that the delta is located on the observers' right side of a center axis (see FIG. 13).

FIG. 12D is a diagram illustrating features of an Arch type fingerprint pattern in an exemplary fashion. Fingerprint patterns classified into the Arch type are characterized in that there is one convex upward core and that there is no center axis (see FIG. 13).

Figure 12E:
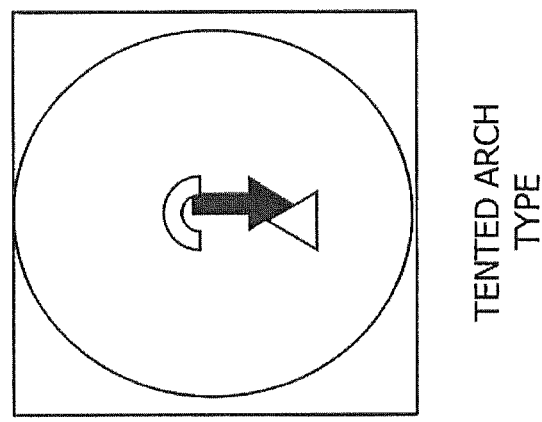
FIG. 12E is a diagram illustrating features of a Tented Arch type fingerprint pattern in an exemplary fashion.

FIG. 12E is a diagram illustrating features of a Tented Arch type fingerprint pattern in an exemplary fashion. Fingerprint patterns classified into the Tented Arch type are characterized in that there are one convex upward core and one delta and that the delta is located substantially on an extension of a center axis (see FIG. 13).

According to the second embodiment, the Whorl type, Right Loop type, Left Loop type, Arch type, and Tented Arch type resulting from classification of fingerprint patterns are used as classes by the identification apparatus.

Figure 14:
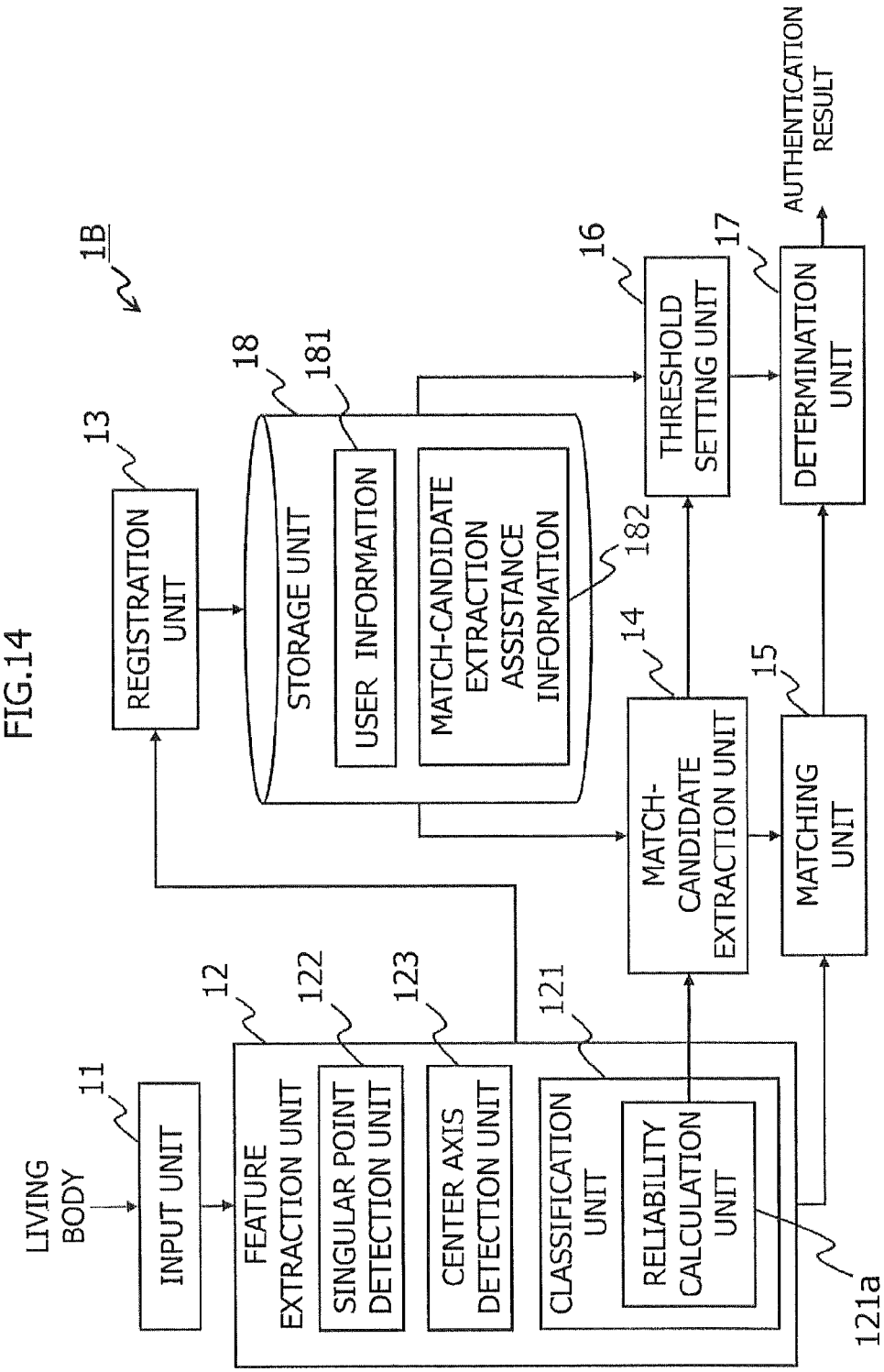
FIG. 14 is a diagram illustrating an exemplary configuration of the identification apparatus.

FIG. 14 is a diagram illustrating an exemplary configuration of the identification apparatus according to the second embodiment. According to the second embodiment, the identification apparatus 1B further includes a singular point detection unit 122 and a center axis detection unit 123 in addition to the components of the identification apparatus 1 according to the first embodiment.

The singular point detection unit 122 detects singular points (fingerprint center and delta) in a fingerprint image (biometric data) received as input from the input unit 11. The center axis detection unit 123 detects a center axis in the biometric data. The singular points detected by the singular point detection unit 122 and the center axis detected by the center axis detection unit 123 are treated as feature information.

The classification unit 121 classifies the feature information including the singular points detected by the singular point detection unit 122 and the center axis detected by the center axis detection unit 123 into classes based on reliability.

FIG. 15A and FIG. 15B illustrate an example of a table which defines classes resulting from classification based on singular points and a center axis as well as defines reliability of the classes. According to the second embodiment, the classification unit 121 and reliability calculation unit 121a determine the classes into which the feature information is classified and the reliability for each of the classes, based on the table illustrated in FIG. 15A and FIG. 15B. In the example of FIG. 15A and FIG. 15B, the reliability is set such that the larger the number of classes into which one item of input data is likely to fall, the lower the reliability for each of the classes. For example, when input data contains one convex upward core, one convex downward core, and two deltas, since the class into which the input data is likely to fall is only the Whorl type, the reliability of the input data is 100. For example, when input data contains only one convex upward core, the input data is likely to fall into any of the Whorl type, Right Loop type, Left Loop type, Arch type, and Tented Arch type. In this case, the reliability of the Whorl type is 30, the reliability of both the Right Loop type and Left Loop type is 20, and the reliability of both the Arch type and Tented Arch type is 15. Also, the table of FIG. 15A and FIG. 15B define the classes into which the feature information is likely to fall, based on sizes of vertical and horizontal ranges with respect to the singular points or center axis contained in the feature information in addition to the number of singular points. The reliability settings in the table of FIG. 15A and FIG. 15B are exemplary, and the reliability is determined, for example, according to normal distribution data of each class, where the normal distribution data is found in advance.

Figure 16:
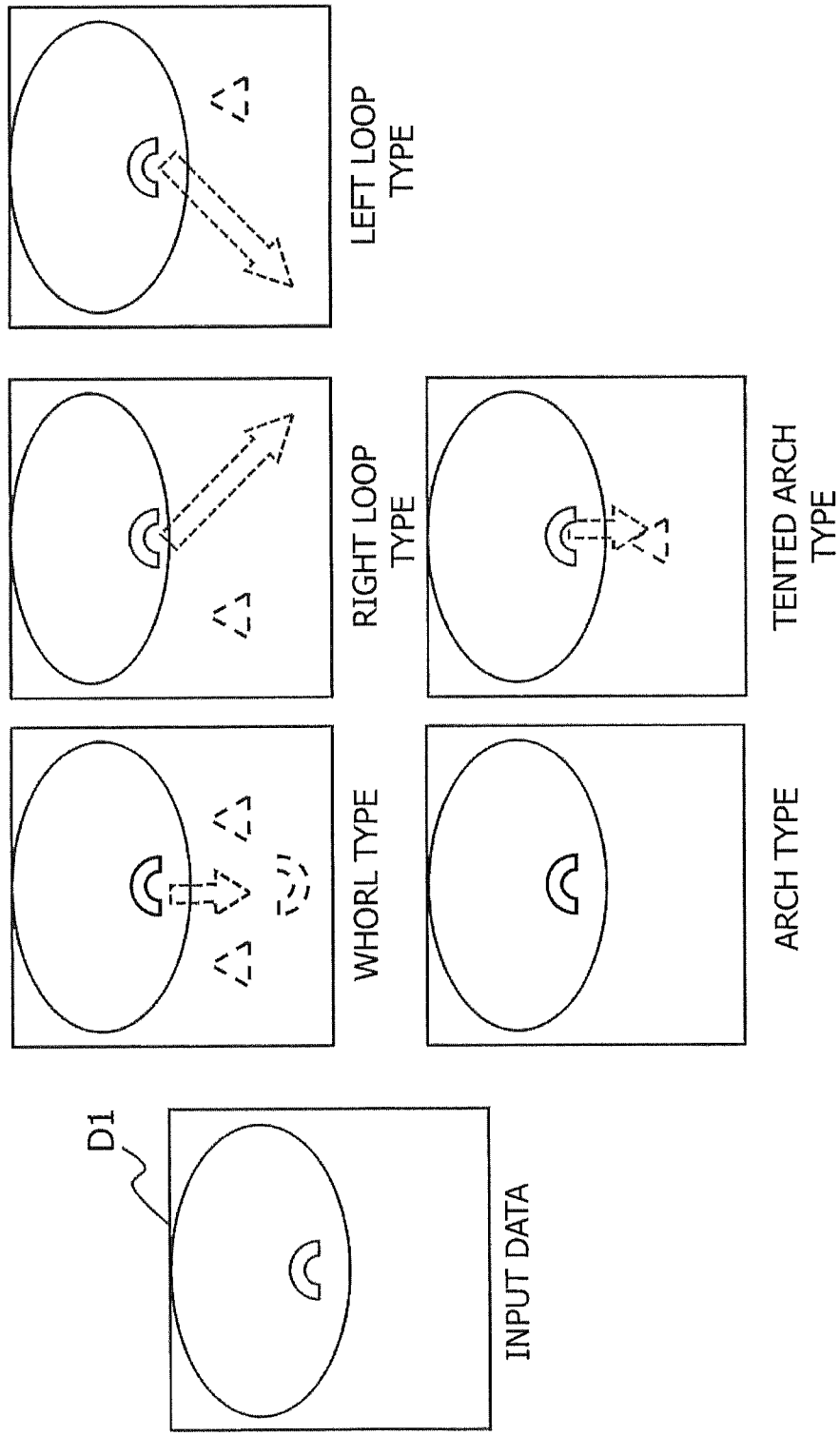
FIG. 16 is a diagram illustrating an example of input data.

FIG. 16 is a diagram illustrating an example of input data. Input data D1 is an example in which a small area on the side of the user's fingertip is entered. The fingerprint image (biometric data) entered through the input unit 11 does not always contain a whole fingerprint image, and there are cases in which a partial image of a fingerprint is entered as exemplified by the input data D1 illustrated in FIG. 16.

The input data D1 has a convex upward core on the lower side of the image. The input data D1, in which an area below the convex upward core is smaller than a predetermined threshold, is likely to fall into any of the Whorl type, Right Loop type, Left Loop type, Arch type, and Tented Arch type as illustrated in FIG. 15A, FIG. 15B and FIG. 16. For example, when the reliability calculation unit 121a uses the table of FIG. 15A and FIG. 15B, the reliability of the class for the input data D1 is determined to be 30 in the case of the Whorl type, 20 in the case of both the Right Loop type and Left Loop type, and 15 in the case of both the Arch type and Tented Arch type.

For example, when the input data D1 has an area sufficiently larger than a predetermined threshold below the convex upward core, it is highly likely that the input data will fall into the Arch type. For example, when the reliability calculation unit 121a uses the table of FIG. 15A and FIG. 15B, the reliability of the class for the input data D1 is determined to be 100 in the case of the Arch type, and 0 in the case of the other types.

Figure 17:
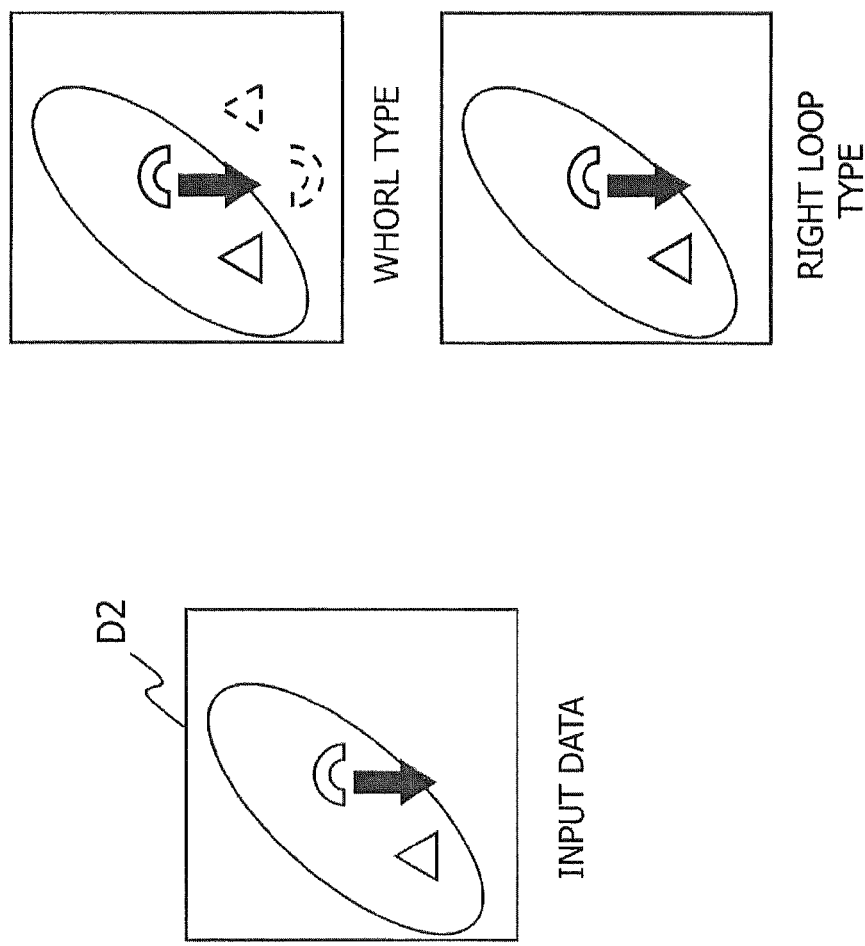
FIG. 17 is a diagram illustrating an example of input data.

FIG. 17 is a diagram illustrating an example of input data. Input data D2 is an example in which part of the user's fingerprint is entered.

The input data D2 has a delta located on the observers' left side of a center axis as well as one convex upward core. Also, in the input data D2, that part of the convex upward core which is located on the observers' left side of a center axis is not sufficiently larger than a predetermined threshold. Therefore, the input data D2 is likely to fall into the Whorl type and Right Loop type as illustrated in FIG. 15A, FIG. 15B and FIG. 17. For example, when the reliability calculation unit 121a uses the table of FIG. 15A and FIG. 15B, the reliability of the class for the input data D2 is determined to be 60 in the case of the Whorl type, 40 in the case of the Right Loop type, and 0 in the case of the other types.

The classification unit 121 compares the reliability calculated by the reliability calculation unit 121a with the classification threshold and determines one or more classes into which the feature information of the biometric data is to be classified. In so doing, the classification threshold may differ among the Whorl type, Right Loop type, Left Loop type, Arch type, and Tented Arch type. When biometric data entered in an ideal state is classified into any one of the Whorl type, Right Loop type, Left Loop type, Arch type, and Tented Arch type, the probability of the biometric data being classified into a given class varies from class to class. For example, when there are a predetermined number of biometric data samples, the result is that a larger proportion of the biometric data is classified into the Whorl type than into the Arch type. According to this result, for example, when biometric data containing one convex upward core is entered, since it is more likely that biometric data is the Whorl type than the Arch type, for example, the classification threshold for the Whorl type is set low and the classification threshold for the Arch type is set high. In so doing, when the highest reliability is assigned to the Whorl type as illustrated in the table of FIG. 15A and FIG. 15B, the identification process is started preferentially from the Whorl type. Therefore, during an identification process of a given item of biometric data, more biometric data is registered in the class into which the given item of biometric data is more likely to be classified, making it possible to perform the identification process more efficiently.

Subsequently, the feature information of the biometric data is outputted to the registration unit 13, and then stored by the registration unit 13 in the storage unit 18. Alternatively, the feature information of the biometric data is outputted to the matching unit 15 and subjected to a matching process.

According to the second embodiment, the identification apparatus 1B classifies biometric data into one or more classes likely to be appropriate, out of the Whorl type, Right Loop type, Left Loop type, Arch type, and Tented Arch type based on the singular points and center axis in a fingerprint pattern. Even if biometric data contains only part of a fingerprint, biometric data is registered or identified by being classified into one or more classes likely to be appropriate. This lowers a failure rate of classification into classes, avoiding false authentication, and thereby improving authentication accuracy.

Third Embodiment

According to a third embodiment, the identification apparatus acquires biometric data with a small area compared to that of the user's finger. In the third embodiment, description of part in common with the first and second embodiments will be omitted.

Figure 18:
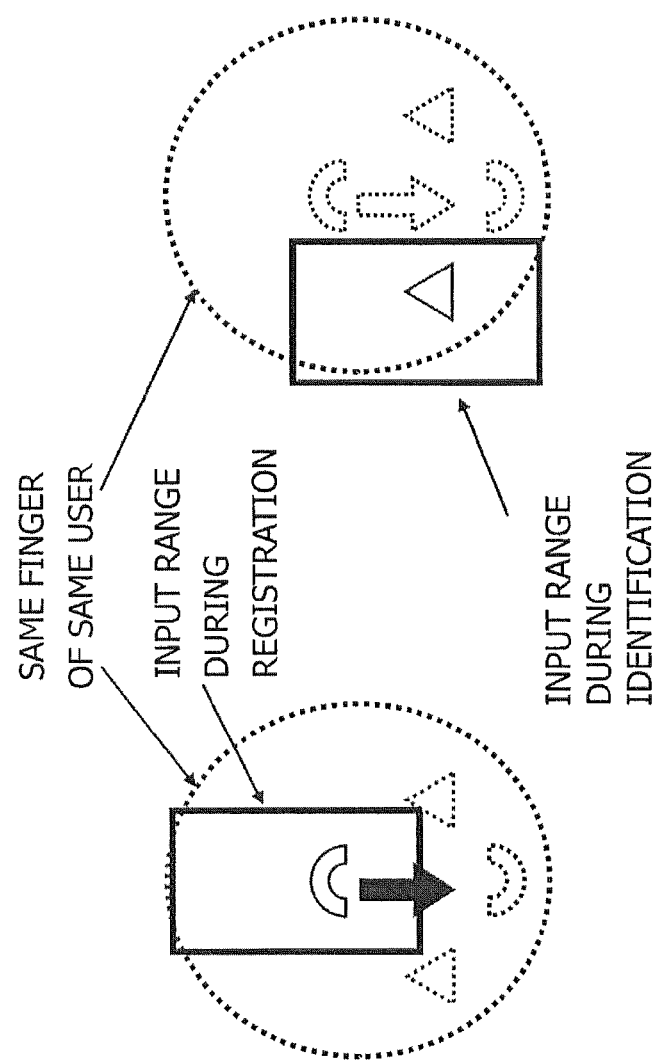
FIG. 18 is a diagram illustrating an example of biometric data whose input range differs between a registration process and identification process.

FIG. 18 is a diagram illustrating an example of biometric data whose input range differs between a registration process and identification process. FIG. 18 illustrates an example of fingerprint images entered during a registration process and an authentication process by the same user using the same finger. The range of the fingerprint of the user's finger is indicated by dotted lines. The input ranges of the fingerprint scanned by a fingerprint sensor are enclosed by solid lines. Also, the fingerprint images illustrated in FIG. 18 are those acquired, for example, when the fingerprint sensor has a small touch area.

For example, when the biometric data input device such as a fingerprint sensor has a sufficiently large touch surface relative to a range of a living body part such as a fingertip, there will be no lack of biometric data even if there is some displacement when the biometric data of the user is entered. Consequently, the results of classification into classes tend to coincide readily between the biometric data during registration and biometric data during identification, making it more likely that a high similarity will be calculated.

On the other hand, when the biometric data input device has a small touch area relative to the range of a living body part, if there is some displacement when biometric data of the user is entered, there is a difference in the input range of biometric data between registration and identification. In the example of FIG. 18, the input range of the biometric data during registration contains a convex upward core, but the input range of the biometric data during identification does not contain any convex upward core and contains one delta. In the example of FIG. 18, even if the fingerprint belongs to the same finger of the same user, different singular points are contained in the input ranges during registration and during identification, causing a difference in the results of classification into classes, reducing the similarity, and thereby making the user less likely to be authenticated.

According to the third embodiment, it is supposed that the input range of the biometric data entered in the identification apparatus could be smaller than a living body part.

FIG. 19 is a diagram illustrating an exemplary configuration of an identification apparatus 1C. The identification apparatus 1C further includes a partial region extraction unit 124 in addition to the components of the identification apparatus 1B according to the second embodiment.

The partial region extraction unit 124 (which corresponds to the extraction unit) accepts biometric data (fingerprint image) as input from the input unit 11. The partial region extraction unit 124 extracts a partial region from the fingerprint image received as input. The partial region is based on the area defined by a minimum length and width of a fingerprint image demanded by characteristics of a fingerprint authentication algorithm or the area defined by a minimum length and width of the touch surface of the fingerprint sensor (the input unit 11) used for operation.

Based on the area of the entered fingerprint image, the partial region extraction unit 124 determines whether to collect fingerprint data multiple times or not. For example, the partial region extraction unit 124 extracts multiple partial regions from the biometric data when the input range of the biometric data (fingerprint image) is equal to or larger than a threshold for use to determine the number of inputs, where the threshold is determined based on length and width of a partial region. When the input range of the biometric data is smaller than the threshold for use to determine the number of inputs, the threshold being determined based on the length and width of a partial region, the partial region extraction unit 124 extracts the partial region and instructs the input unit 11 to acquire the biometric data multiple times. The threshold for use to determine the number of inputs is a threshold for the size of the biometric data input range, is used to determine whether the input unit 11 needs to acquire the biometric data multiple times, and is sufficiently larger than the range of the partial region.

The partial region extraction unit 124 extracts the partial region in such a way as to include a singular point closest to an edge of a contact range of the entered biometric data. Incidentally, the partial region is extracted by making an adjustment such that the singular point will be at a predetermined distance from the perimeter of the partial region.

FIG. 20A, FIG. 20B, and FIG. 20C are diagrams illustrating examples of relationship between an input range of entered biometric data (fingerprint image) and a partial region extracted by the partial region extraction unit 124.

FIG. 20A illustrates an example in which the input range of biometric data is equal to or larger than the threshold for use to determine the number of inputs. In the example of FIG. 20A, the partial region extraction unit 124 extracts multiple partial regions from the biometric data entered once. A partial region D31 is an example in which a range containing the singular point closest to the upper end of the entered biometric data is extracted. A partial region D32 is an example in which a range containing the singular point closest to the lower end of the entered biometric data is extracted. A partial region D33 is an example in which a range containing the singular point closest to the left end of the entered biometric data is extracted.

FIG. 20B illustrates an example in which the input range of biometric data is about the same size as a partial region. This is the case, for example, when the touch surface of the fingerprint sensor has a small size even though the user places a finger in sufficient contact with the touch surface of the fingerprint sensor. A partial region D41, which has the same range as the partial region D31 in FIG. 20A, is an example in which a range containing the singular point closest to the upper end of the entered biometric data is extracted. A partial region D42, which has the same range as the partial region D32 in FIG. 20A, is an example in which a range containing the singular point closest to the lower end of the entered biometric data is extracted. A partial region D43, which has the same range as the partial region D33 in FIG. 20A, is an example in which a range containing the singular point closest to the left end of the entered biometric data is extracted.

FIG. 20C illustrates an example in which the input range of biometric data is smaller than a partial region. This is the case, for example, when the contact area between the finger of the user and the touch surface of the fingerprint sensor is not large enough even though the touch surface of the fingerprint sensor is sufficiently large in size relative to the partial region. A partial region D51, which has the same range as the partial region D31 in FIG. 20A and partial region D41 in FIG. 20B, is an example in which a range containing the singular point closest to the upper end of the entered biometric data is extracted. A partial region D52, which has the same range as the partial region D32 in FIG. 20A and partial region D42 in FIG. 20B, is an example in which a range containing the singular point closest to the lower end of the entered biometric data is extracted. A partial region D53, which has the same range as the partial region D33 in FIG. 20A and partial region D43 in FIG. 20B, is an example in which a range containing the singular point closest to the left end of the entered biometric data is extracted.

In both FIG. 20B and FIG. 20C, since the input range is smaller than the threshold for use to determine the number of inputs, the partial region extraction unit 124 instructs the input unit 11 to acquire the biometric data multiple times.

In acquiring a fingerprint image multiple times, when predetermined conditions are satisfied, the partial region extraction unit 124 indicates to the input unit 11 that fingerprint image input is complete. On the part of the partial region extraction unit 124, for example, when the items of feature information from each partial region reaches a predetermined number as a result of classification into classes performed by the classification unit 121, the partial region extraction unit 124 detects completion of biometric data input.

For example, when the classes into which the feature information of the partial region D41 in FIG. 20B is classified are sorted according to reliability, if biometric data of a partial region which produces the same results is entered a predetermined number of times (e.g., three times), completion of biometric data input is detected.

If the input range of biometric data is smaller than the threshold for use to determine the number of inputs and even smaller than a partial region extraction determination threshold which is a value smaller than the partial region, the partial region extraction unit 124 determines that it is not possible to extract a partial region from the entered biometric data. In this case, the partial region extraction unit 124 discards the entered biometric data and instructs the input unit 11 to acquire biometric data.

The singular point detection unit 122 and center axis detection unit 123 detect any singular point and center axis in the biometric data of the partial regions extracted by the partial region extraction unit 124 and generate feature information on each partial region.

The classification unit 121 classifies the feature information of each partial region generated by the singular point detection unit 122 and center axis detection unit 123 into at least one of the Whorl type, Right Loop type, Left Loop type, Arch type, and Tented Arch type.

The partial regions D31, D41, and D51 in FIG. 20A, FIG. 20B, and FIG. 20C correspond to the same range of the same finger of the same user. Similarly, the partial regions D32, D42, and D52 correspond to the same range of the same finger of the same user. The partial regions D33, D43, and D53 correspond to the same range of the same finger of the same user.

The partial regions D31, D41, and D51, each of which contains one convex upward core and has a small area below the convex upward core, are likely to fall into any of the Whorl type, Right Loop type, Left Loop type, Arch type, and Tented Arch type. When the reliability calculation unit 121a uses the table of FIG. 15A and FIG. 15B, the reliability is 30 in the case of the Whorl type, 20 in the case of both the Right Loop type and Left Loop type, and 15 in the case of both the Arch type and Tented Arch type.

The partial regions D32, D42, and D52, each of which contains one convex upward core and one convex downward core, are likely to fall into the Whorl type. When the reliability calculation unit 121a uses the table of FIG. 15A and FIG. 15B, the reliability of the Whorl type is 100.

The partial regions D33, D43, and D53, each of which contains one delta and has a large area above the delta, are likely to fall into the Whorl type, Right Loop type, and Left Loop type. When the reliability calculation unit 121a uses the table of FIG. 15A and FIG. 15B, the reliability is 40 in the case of the Whorl type, and 30 in the case of both the Right Loop type and Left Loop type.

Therefore, the classification of the feature information of partial regions in the same range of the same finger of the same user into classes is the same in all the examples of FIG. 20A, FIG. 20B, and FIG. 20C. Even when registration and authentication are performed using the feature information of partial regions, classification into classes is performed properly.

When the entered biometric data contains no singular point, the partial region extraction unit 124 extracts a partial region in such a way as to include a region which has the most characteristic shape. The feature information of partial regions extracted at this time contains no singular point or center axis. The feature information is classified by the classification unit 121 into the Whorl type, Right Loop type, Left Loop type, Arch type, and Tented Arch type.

FIG. 21 illustrates an example of biometric data (fingerprint image) which does not contain a singular point. In FIG. 21, although there is no singular point, ridges with monotonous waveforms are arranged nearly in parallel. In this case, the partial region extraction unit 124 detects a location where each ridge has its largest curvature and extracts a partial region which contains as many such locations as possible. Incidentally, in the example of FIG. 21, the classification unit 121 may classify the feature information by assuming that a convex upward core is contained. Also, in FIG. 21, the partial region to be extracted is not limited to the one containing locations where ridges have their largest curvature, and may be, for example, a range in which an average amount of changes in gradients of tangents to ridges in a predetermined range becomes the largest.

The feature extraction unit 12 generates feature information on each of the extracted partial regions, classifies the feature information into classes, and calculates reliability. For example, if three partial regions are extracted, three sets of classification results, three values of reliability, and three items of feature information are obtained.

When results of classification into classes are the same among feature information of multiple partial regions, partial regions with low reliability may be discarded, leaving the feature information on the partial region with the highest reliability. This makes it possible to achieve efficient processing even if the PC or authentication server has low processing power.

In the case of a biometric data registration process, the feature information of partial regions are stored as part of the user information 181 and match-candidate extraction assistance information 182 in the storage unit 18 by the registration unit 13.

In the case of a biometric data identification process, the identification process is repeated as many times as there are extracted partial regions. For example, when three partial regions are extracted, the identification process is repeated up to three times. In so doing, the identification process is performed for the feature information of partial regions in decreasing order of reliability of the feature information for each class, and the process is completed when biometric data belonging to the given user is identified among registered data. For example, when three partial regions are extracted, if the similarity of the feature information of the first partial region exceeds the identification determination threshold for the class into which the feature information is classified, the identification process for the second and third partial regions are omitted.

Figure 22:
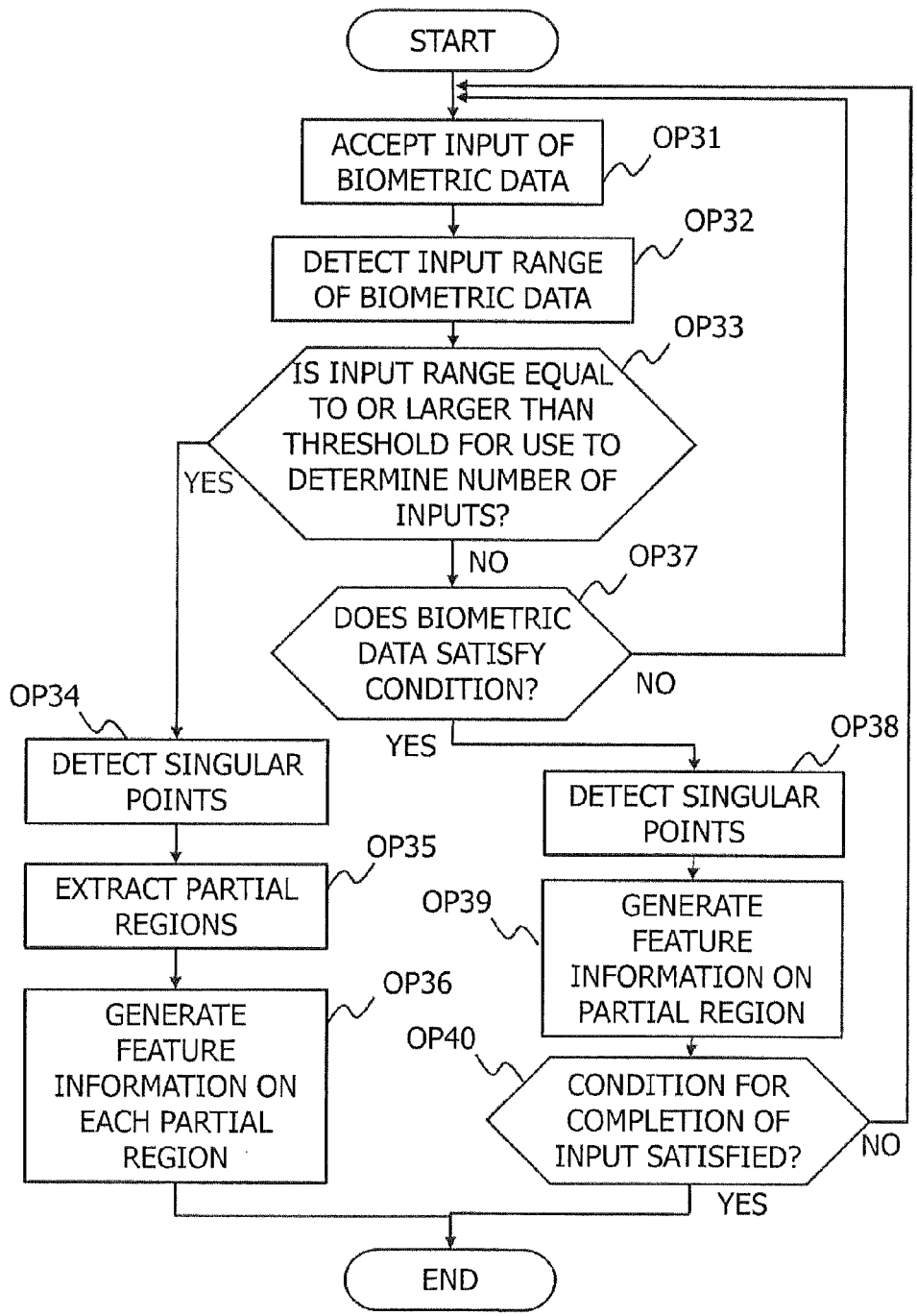
FIG. 22 is a diagram illustrating an exemplary flow of a feature information generation process.

FIG. 22 is a diagram illustrating an exemplary flow of a feature information generation process. The identification apparatus 1C starts a generation process for feature information of the biometric data, for example, when directed by the user to register biometric data or when the user logs onto the computer serving as the identification apparatus 1C.

The feature extraction unit 12 of the identification apparatus 1C accepts input of biometric data (fingerprint image) via the input unit 11 (OP31). The partial region extraction unit 124 detects the input range of the biometric data entered via the input unit 11 (OP32).

Next, the partial region extraction unit 124 determines whether the input range of the biometric data is equal to or larger than the threshold for use to determine the number of inputs (OP33). By determining whether the input range of the biometric data is equal to or larger than the threshold for use to determine the number of inputs, the partial region extraction unit 124 determines whether it is sufficient to enter the biometric data once or the biometric data needs to be entered multiple times.

When the input range of the biometric data is equal to or larger than the threshold for use to determine the number of inputs (OP33: Yes), the partial region extraction unit 124 determines that it is enough to enter the biometric data once. The partial region extraction unit 124 extracts singular points from the biometric data (OP34).

The partial region extraction unit 124 extracts at least one partial region from the biometric data by making sure that the partial region contains at least one of the detected singular points (OP35). In so doing, when there is no singular point in the biometric data, the partial region extraction unit 124 extracts the partial region by making sure that the partial region contains a characteristic location (see, for example, FIG. 21) which can be regarded as a singular point.

The singular point detection unit 122 and center axis detection unit 123 detect any singular point and center axis in the at least one partial region extracted by the partial region extraction unit 124 and generate feature information on each partial region (OP36). In so doing, when the partial region does not contain any singular point, the singular point detection unit 122 establishes the absence of a singular point as feature information of the partial region. Alternatively, when the partial region does not contain any singular point, but contains a feature which can be regarded as a singular point, the singular point detection unit 122 may generate feature information by regarding the feature as a singular point. The generated feature information is classified into classes by the classification unit 121.

When the input range of the biometric data is smaller than the threshold for use to determine the number of inputs (OP33: No), the partial region extraction unit 124 determines that the biometric data needs to be entered multiple times. The partial region extraction unit 124 determines whether the input range of the biometric data satisfies a condition for extracting a partial region (OP37). That is, the partial region extraction unit 124 determines whether or not the input range of the biometric data is equal to or larger than the partial region extraction determination threshold. By determining whether or not the input range of the biometric data is equal to or larger than the partial region extraction determination threshold, the partial region extraction unit 124 determines whether or not any partial region can be extracted from the biometric data.

When the input range of the biometric data does not satisfy the condition, i.e., when the input range of the biometric data is smaller than the partial region extraction determination threshold (OP37: No), the partial region extraction unit 124 determines that it is not possible to extract a partial region from the biometric data. The partial region extraction unit 124 discards the biometric data and instructs the input unit 11 to collect biometric data. Subsequently, the processing returns to OP31.

When the input range of the biometric data satisfies the condition, i.e., when the input range of the biometric data is equal to or larger than the partial region extraction determination threshold (OP37: Yes), the partial region extraction unit 124 determines that a partial region can be extracted from the biometric data.

The partial region extraction unit 124 detects singular points in the biometric data (OP38). The partial region extraction unit 124 extracts a partial region by making sure that the partial region contains at least one of the detected singular points. In so doing, when there is no singular point in the biometric data, the partial region extraction unit 124 extracts the partial region by making sure that the partial region contains a characteristic location (see, for example, FIG. 21) which can be regarded as a singular point. Also, when the biometric data contains multiple singular points, but not all of them are contained in a single partial region, the partial region extraction unit 124 extracts multiple partial regions so that all the singular points will be extracted.

The singular point detection unit 122 and center axis detection unit 123 detect any singular point and center axis in the partial region extracted by the partial region extraction unit 124 and generate feature information (OP39). In so doing, when the partial region does not contain any singular point, the singular point detection unit 122 establishes the absence of a singular point as feature information of the partial region. Alternatively, when the partial region does not contain any singular point, but contains a feature which can be regarded as a singular point, the singular point detection unit 122 may generate feature information by regarding the feature as a singular point. The generated feature information is classified into classes by the classification unit 121.

Once feature information of the biometric data is generated and classified, the partial region extraction unit 124 determines whether or not a condition for completion of input has been satisfied (OP40). When the condition for completion of input has not been satisfied (OP40: No), the partial region extraction unit 124 instructs the input unit 11 to collect biometric data. When the condition for completion of input has been satisfied (OP40: Yes), the feature information generation process is finished.

During a biometric data registration process and biometric data identification process, the identification apparatus 1C according to the third embodiment extracts partial regions from entered biometric data, generates feature information on the partial regions, and classifies the feature information of the partial regions into classes. Consequently, even if the input range of the biometric data is smaller than the entire fingerprint such as when the fingerprint sensor has a small touch area relative to the user's finger or when the user's finger is displaced, the feature information is properly classified into classes for registration and authentication.

Fourth Embodiment

According to a fourth embodiment, the identification apparatus determines whether entered biometric data is suitable for a registration process and identification process. When the biometric data is not suitable, the identification apparatus outputs a message prompting the user to enter biometric data again. Data not suitable for a registration process and identification process is, for example, data which is not classified into any class.

In the fourth embodiment, description of part in common with the first to third embodiments will be omitted.

Figure 23A:
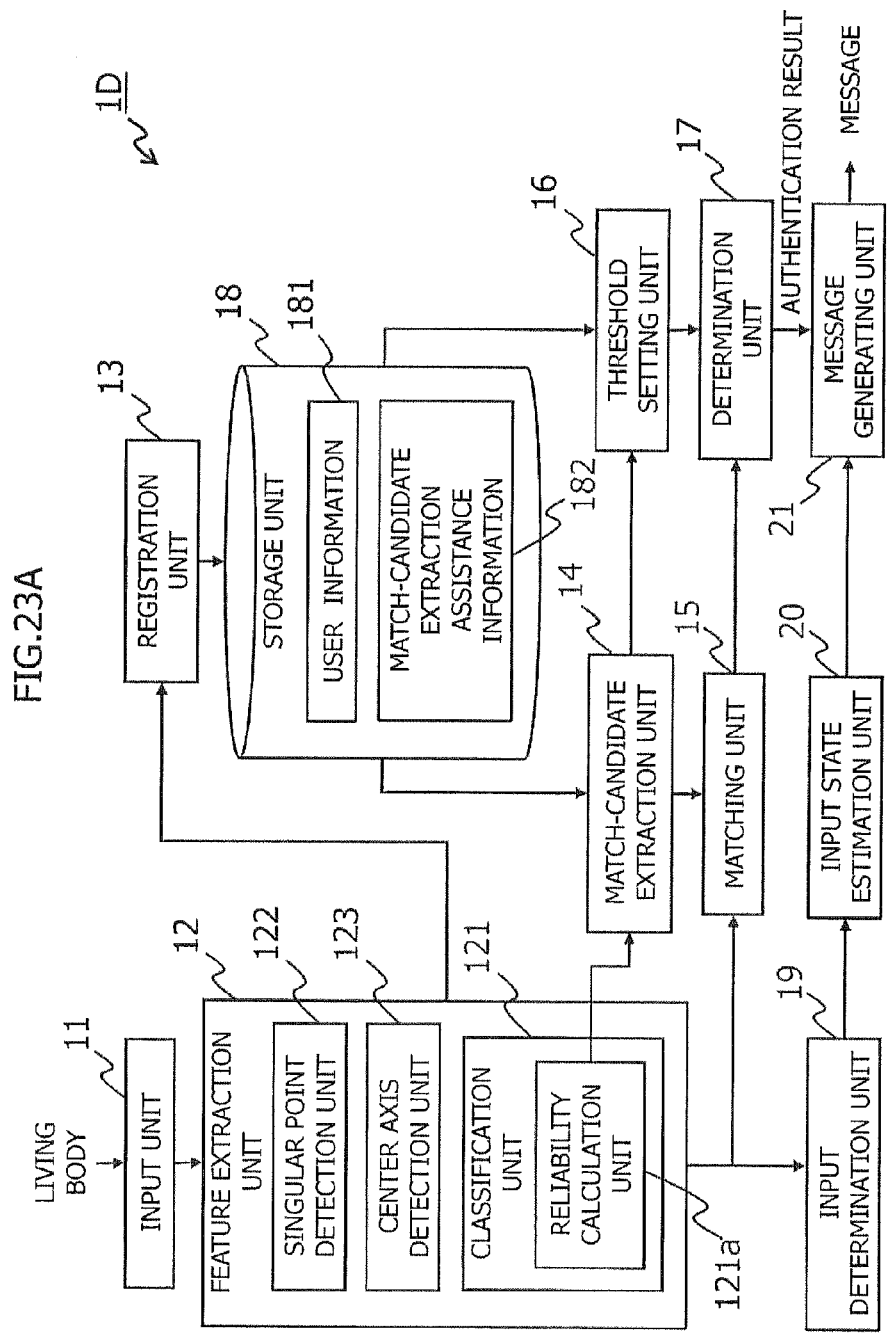
FIG. 23A is a diagram illustrating an exemplary configuration of an identification apparatus.
Figure 23B:
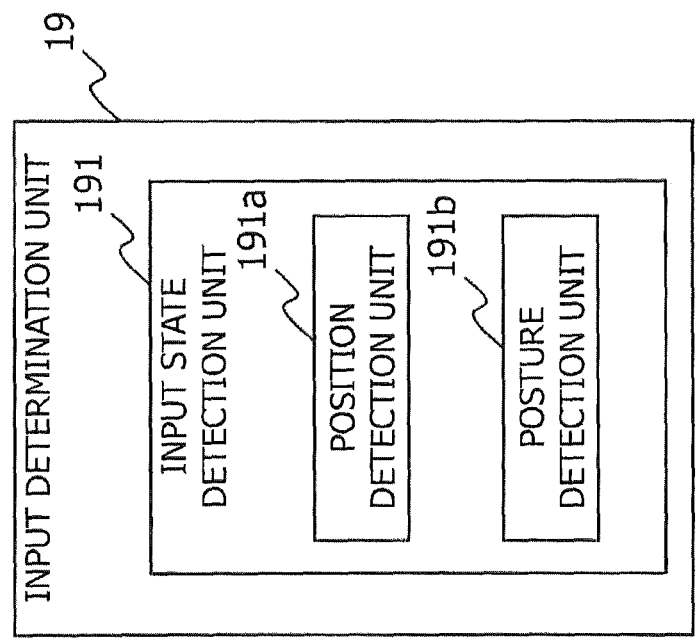
FIG. 23B is a diagram illustrating an exemplary configuration of an identification apparatus.
Figure 24:
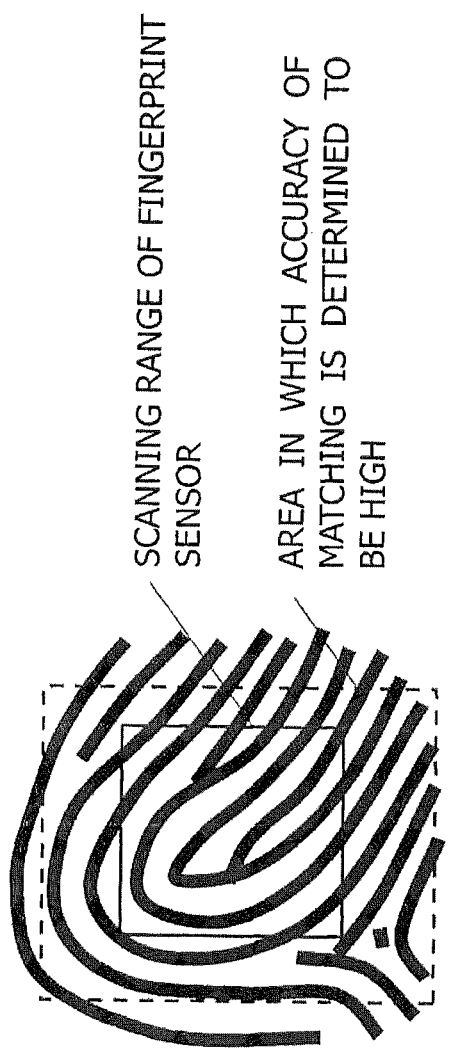
FIG. 24 is an example of a fingerprint image obtained by a contact sensor device.

FIG. 23A and FIG. 23B are diagrams illustrating an exemplary configuration of an identification apparatus 1D according to the fourth embodiment. The identification apparatus 1D includes an input determination unit 19, an input state estimation unit 20, and a message generating unit 21 in addition to the components of the identification apparatus 1B according to the second embodiment.

The input determination unit 19 accepts entered biometric data (fingerprint image) and feature information as input from the feature extraction unit 12. When, for example, the reliability of the feature information for each class does not reach the classification threshold, the input determination unit 19 determines that the biometric data is not suitable for the registration process and identification process. Also, the input determination unit 19 may determine whether entered biometric data is suitable for the registration process and identification process, based on, for example, size information such as area, width, and length; contrast; the number of feature points; the presence or absence of singular points; and the like. Minimum sizes estimated based on, for example, the age, sex, and type of finger used, and the like of the targeted user are used as the size information.

The input determination unit 19 includes an input state detection unit 191. When it is determined that biometric data is not suitable for the registration process and identification process, the input state detection unit 191 (which corresponds to the detection unit) detects input state of the biometric data. The input state of biometric data is detected using, for example, the contact area between the touch surface of the fingerprint sensor and the finger, types of singular point, distance from each singular point to a contact range boundary, and distance from the contact range boundary to an imaging range on the touch surface of the fingerprint sensor.

The input state detection unit 191 includes, a position detection unit 191a and a posture detection unit 191b. The position detection unit 191a detects position relationship of the finger relative to the fingerprint sensor, such as displaced excessively rightward, displaced excessively leftward, displaced excessively forward, and displaced excessively rearward. The posture detection unit 191b detects postures of the finger such as a raised posture and laid posture. For example, when the fingerprint center in biometric data is located below the contact range as in the case of the input data illustrated in FIG. 16, the posture detection unit 191b detects an excessively raised state of the finger. Conversely, if the biometric data lacks a fingerprint center and a delta is detected, the posture detection unit 191b detects an excessively laid state. When the identification apparatus 1D is equipped with a slide fingerprint sensor, the input state may be detected based on velocity, direction, and the like of the finger relative to the sensor.

The input determination unit 19 outputs the input state of biometric data detected by the input state detection unit 191 to the input state estimation unit 20.

The input state estimation unit 20 (which corresponds to the estimation unit) accepts the input state of the user as input from the input determination unit 19. The input state estimation unit 20 estimates how to improve the input state of biometric data in order to improve reliability. For example, when a state of being displaced excessively rightward is received from the input determination unit 19, the input state estimation unit 20 estimates that the finger needs to be moved leftward. On the other hand, for example, when an excessively raised state is received from the input determination unit 19, the input state estimation unit 20 estimates that the finger needs to be laid down. The input state estimation unit 20 outputs a result of estimation to the message generating unit 21.

When it is determined that the biometric data is not suitable for the registration process and identification process, the message generating unit 21 (which corresponds to the notification unit) obtains the input state estimation result as input from the input state estimation unit 20. The message generating unit 21 generates a message which allows the user to recognize the input state estimation result in the form of a character string, an icon, voice, or the like. The generated message is outputted through a display, speaker, or the like, attached to the identification apparatus 1D.

When it is determined that the biometric data is suitable for registration and identification, the message generating unit 21 obtains an identification result as input from the determination unit 17. When the identification result is an identification failure, the message generating unit 21 generates a message indicating the identification failure and prompting the user to enter biometric data. The generated message is outputted through a display, speaker, or the like, attached to the identification apparatus 1D.

The identification apparatus 1D according to the fourth embodiment determines whether or not entered biometric data is suitable for the registration process and identification process, estimates a method for improving the input state of the biometric data when the entered biometric data is not suitable, and notifies the user of the estimated method. This allows the user to enter biometric data again in proper position and posture, and the biometric data thus entered is highly likely to be suitable for the registration process and identification process. As the biometric data is entered as data suitable for the registration process and identification process, the biometric data is classified properly and the registration and identification processes are performed properly.

<Others>

The present invention is not limited to the embodiments described above, and may be embodied without departing from the spirit and scope of the present invention.

In the embodiments described above, the identification apparatus is implemented by a computer. Alternatively, the identification apparatus may be implemented by a special-purpose personal authentication apparatus.

Also, the identification apparatus may be configured such that user information and feature information will be held by multiple computers and that the processes of the matching unit 15 will be distributed across the multiple computers. By distributing the processes of the matching unit 15 across multiple computers, it is possible to reduce the time taken to match input data and registered data against each other during authentication.

Also, the identification apparatus is applicable not only to personal authentication which uses a fingerprint, but also to personal authentication which uses a palm print, nose pattern, hand geometry, palm vein pattern, finger vein pattern, voice print, facial appearance, gait, auricle, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An identification apparatus comprising a processor executing a process that causes the identification apparatus to perform:
   determining two or more classes into which input biometric data is classified out of a plurality of classes based on features of the input biometric data, where a plurality of items of registered biometric data have been classified into at least one of the plurality of classes;
   calculating similarity between the input biometric data and each item of the registered biometric data registered in each of the determined two or more classes into which the input biometric data is classified; and
   identifying data on a user who has entered the input biometric data among the registered biometric data registered in any of the determined two or more classes, based on the similarity to the input biometric data; and
   setting a threshold for each of the determined two or more classes in order to identify data on the user who has entered the input biometric data, wherein
   each of the classes is set in advance,
   when, among the registered biometric data registered in each of the determined two or more classes, there is at least one biometric data item whose similarity to the input biometric data exceeds the threshold set for each of the determined two or more classes, the identifying identifies that the input biometric data and the registered biometric data item belong to the same user.

2. The identification apparatus according to claim 1, wherein the setting sets the threshold for each of the determined two or more classes based on a false accept rate expected of the identification apparatus and a false accept rate expected of each of the determined two or more classes.

3. The identification apparatus according to claim 1, wherein the processor executes the process that further causes the identification apparatus to perform registering the biometric data entered during registration into the determined two or more classes determined by the determining.

4. The identification apparatus according to claim 1, wherein the processor executes the process that further causes the identification apparatus to perform extracting at least one partial region from the input biometric data,
   wherein, based on a feature included in the at least one partial region, the determining determines two or more classes into which the at least one partial region is classified, and
   the calculating calculates similarity between the at least one partial region and the partial region registered in each of the determined two or more classes into which the at least one partial region is classified.

5. The identification apparatus according to claim 1, wherein the processor executes the process that further causes the identification apparatus to perform:
   detecting an input state of the input biometric data;
   estimating a method for improving the input state of the input biometric data; and
   notifying the user of the method for improving the input state of the input biometric data.

6. An identification method executed by a computer, comprising:
   determining two or more classes into which input biometric data is classified out of a plurality of classes based on features of the input biometric data, where a plurality of items of registered biometric data have been classified into at least one of the plurality of classes;
   calculating similarity between the input biometric data and each item of the registered biometric data registered in each of the determined two or more classes into which the input biometric data is classified; and
   identifying data on a user who has entered the input biometric data among the registered biometric data registered in any of the determined two or more classes, based on the similarity to the input biometric data; and
   setting a threshold for each of the determined two or more classes in order to identify data on the user who has entered the input biometric data, wherein
   each of the classes is set in advance,
   when, among the registered biometric data registered in each of the determined two or more classes, there is at least one biometric data item whose similarity to the input biometric data exceeds the threshold set for each of the determined two or more classes, the identifying identifies that the input biometric data and the registered biometric data item belong to the same user.

7. A non-transitory computer-readable recording medium recording thereon a program executed by a computer, the program comprising:
   determining two or more classes into which input biometric data is classified out of a plurality of classes based on features of the input biometric data, where a plurality of items of registered biometric data have been classified into at least one of the plurality of classes;
   calculating similarity between the input biometric data and each item of the registered biometric data registered in each of the determined two or more classes into which the input biometric data is classified; and
   identifying data on a user who has entered the input biometric data among the registered biometric data registered in any of the determined two or more classes, based on the similarity to the input biometric data; and
   setting a threshold for each of the determined two or more classes in order to identify data on the user who has entered the input biometric data, wherein
   each of the classes is set in advance,
   when, among the registered biometric data registered in each of the determined two or more classes, there is at least one biometric data item whose similarity to the input biometric data exceeds the threshold set for each of the determined two or more classes, the identifying identifies that the input biometric data and the registered biometric data item belong to the same user.

* * * * *